United States Patent [19]
Kishimoto et al.

[11] Patent Number: 5,895,128
[45] Date of Patent: Apr. 20, 1999

[54] ELECTRONIC FLASH AND A CAMERA PROVIDED WITH THE SAME

[75] Inventors: Tsuyoshi Kishimoto, Hannan; Masataka Hamada, Osakasayama, both of Japan

[73] Assignee: Minolta Co., Ltd., Osaka, Japan

[21] Appl. No.: 09/009,314

[22] Filed: Jan. 20, 1998

[30]   Foreign Application Priority Data

Jan. 21, 1997 [JP] Japan .................................. 9-008985

[51] Int. Cl.$^6$ .................................................. G03B 15/05
[52] U.S. Cl. ................................................ 396/61; 396/182
[58] Field of Search .................................... 396/182, 155, 396/61, 157, 164, 225; 348/224, 370, 371; 362/12, 11; 315/241 P

[56]   References Cited

U.S. PATENT DOCUMENTS

| | | | |
|---|---|---|---|
| 4,485,336 | 11/1984 | Yoshiyama et al. | 315/241 P |
| 4,847,680 | 7/1989 | Okino | 348/224 |
| 5,452,049 | 9/1995 | Takagi | 396/155 |
| 5,485,201 | 1/1996 | Aoki et al. | 348/223 |
| 5,815,204 | 9/1998 | Abe et al. | 348/371 |

*Primary Examiner*—W. B. Perkey
*Attorney, Agent, or Firm*—Burns, Doane, Swecker & Mathis, LLP

[57]   ABSTRACT

An electronic flash includes a primary emission unit for emitting flash light for illuminating an object, an auxiliary emission unit for emitting light having a different color temperature from the flash light; and a controller for controlling emission of the auxiliary emission unit to adjust the color temperature of illumination light to the object. This electronic flash makes it possible to change the color temperature of illumination light to an object quickly and easily.

19 Claims, 18 Drawing Sheets

ELECTRONIC FLASH AND A CAMERA PROVIDED WITH THE SAME

This application is based on patent application No. 9-8985 filed in Japan, the contents of which is hereby incorporated by reference.

BACKGROUND OF THE INVENTION

This invention relates to an electronic flash capable of changing the color temperature of flash light for illuminating an object and a camera provided with such electronic flash.

As an electronic flash externally connectable with a camera, an electronic flash using a xenon discharge tube is generally widely used. A color panel set is known as an accessory of this electronic flash. This color panel set includes four color panels, e.g., red, blue, green and yellow, and a filter panel for converting the color temperature. By suitably combining these panels and mounting them on a light emitter of the flash, special color effects in color photographing can be obtained and the color temperature of the flash can be corrected according to the type of the film.

With the conventional color panel set, a photographer has to suitably combine a color panel and a color temperature conversion filter panel and manually mounting them on the light emitter of the flash. Accordingly, it is difficult to easily change the color temperature of the flash light. Since the colors and the color mixing ratio of color panels are constant, the color temperature of the flash light cannot be continuously adjusted. A certain degree of experience is required to obtain a flash light of a desired color. Thus, according to the known method for changing the flash light by color panels, it is very difficult to quickly change the color temperature of the flash light into a desired one by a simple operation.

SUMMARY OF THE INVENTION

It is an object of the present invention to provide an electronic flash and a flash-provided camera which have overcome the problems residing in the prior art.

According to an aspect of the present invention, an electronic flash comprises: a primary emission unit which emits flash light for illuminating an object; an auxiliary emission unit which emits light having a different color temperature from the flash light emitted by the primary emission unit to the object; and a controller which controls emission of the auxiliary emission unit when the primary emission unit emits flash light to adjust the color temperature of illumination light to the object.

According to another aspect of the present invention, a camera comprises: an electronic flash which emits flash light for illuminating an object for photography; an auxiliary illumination unit which emits light having a different color temperature from the flash light emitted by the electronic flash to the object; and a controller which controls emission of the auxiliary emission unit when the electronic flash emits flash light to adjust the color temperature of illumination light to the object.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1:
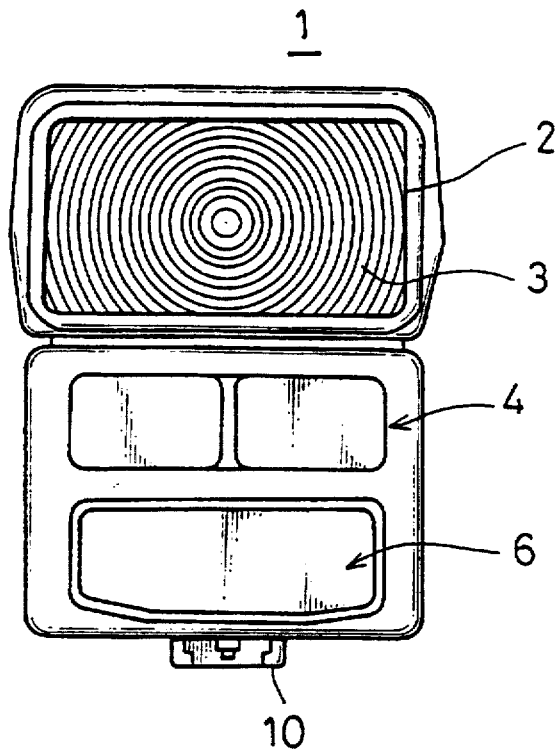
FIG. 1 is a front view of an electronic flash according to a first embodiment of the invention.
Figure 2:
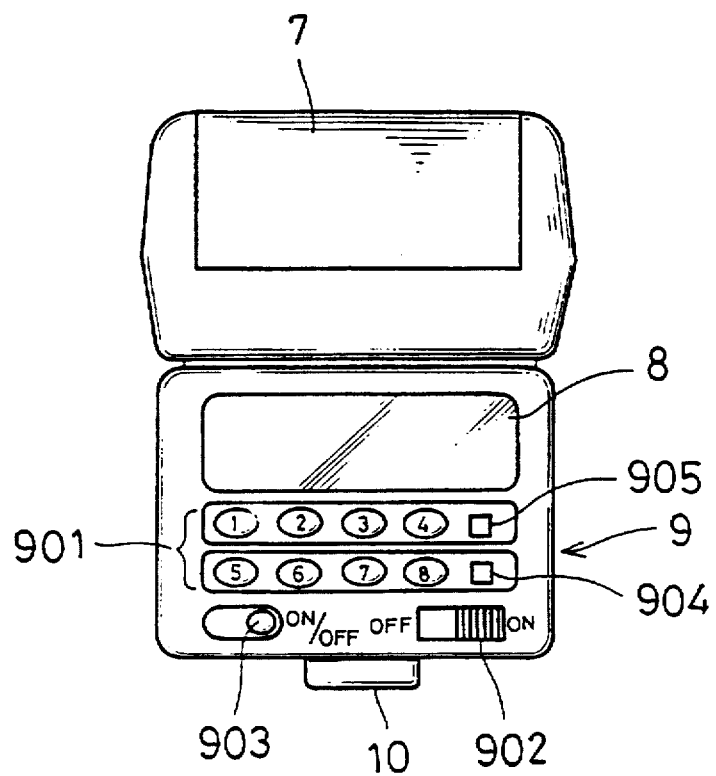
FIG. 2 is a rear view of the electronic flash shown in FIG. 1.

FIG. 1 is a front view of an electronic flash or a flash light emitting device according to a first embodiment of the invention; FIG. 2 is a rear view of the electronic flash; and FIG. 3 is a perspective view showing a construction of an LED unit.

The electronic flash 1 is provided at its upper front portion with a first light emission window 2. Behind this first light emission window 2 is provided a flash light emitting unit for emitting a flash light. The flash light emitting unit serves as a primary emission unit. The flash light emitting unit has a xenon discharge tube which is a light source of flash light, and this xenon discharge tube is movably provided along forward and backward directions so that the coverage of flash light can be changed. At the first light emission window 2 is provided a condenser lens 3 constructed by a Fresnel lens in order to enhance the illumination efficiency of the flash light for illuminating an object located in front.

Below the first light emission window 2 is provided a second light emission window 4 for changing the color temperature of the flash light, and a light emitting diode unit 5 (hereinafter, referred to as "LED unit") is provided in a position behind the second light emission window 4. The LED unit 5 serves as an auxiliary emission unit.

Figure 3:
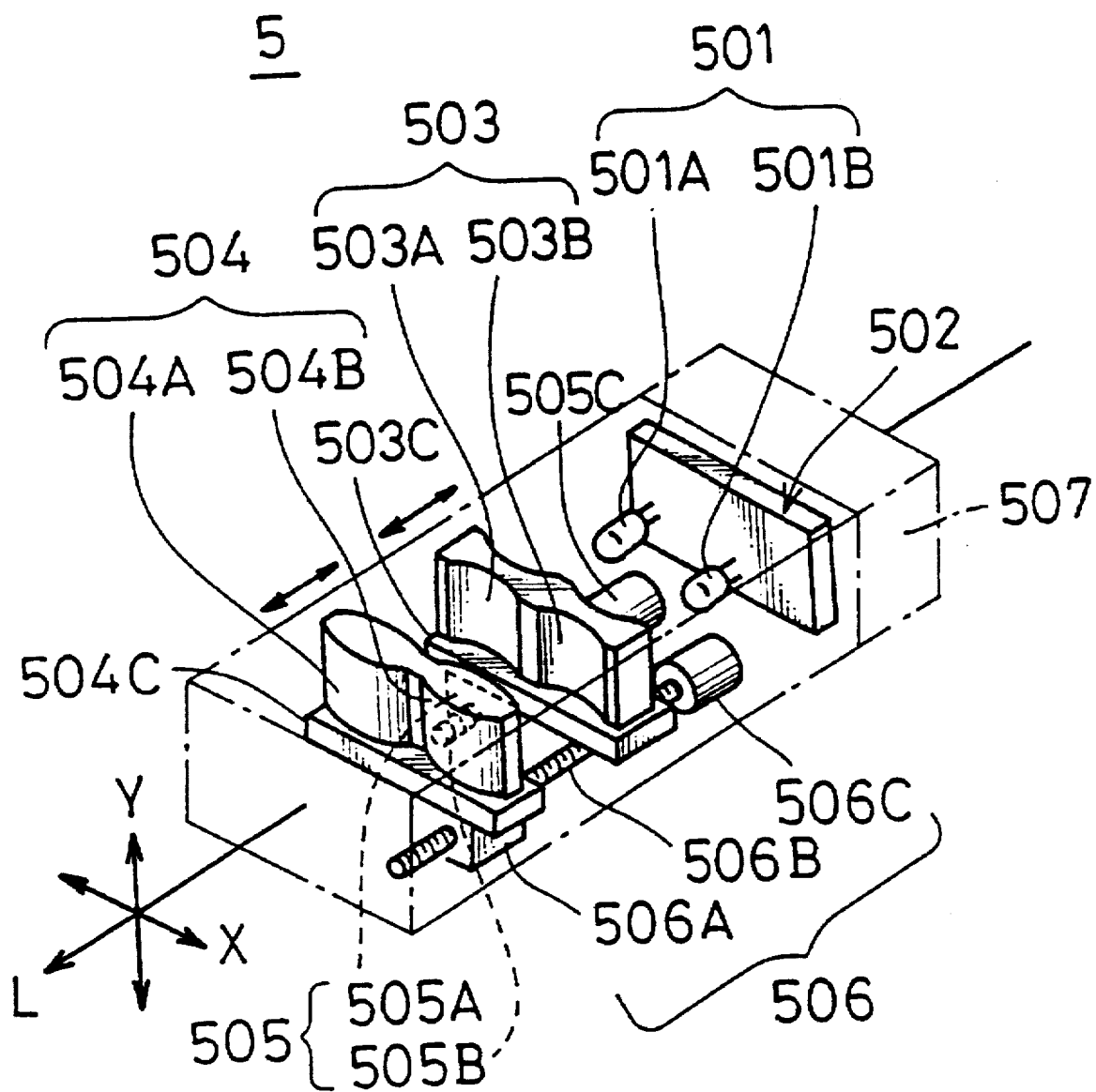
FIG. 3 is a perspective view showing a construction of an LED unit.

The LED unit 5 is, as shown in FIG. 3, mainly provided with a pair of light emitting elements 501 including light emitting diodes, an LED drive circuit 502 for driving the light emitting elements 501, a diffuser lens 503 and a condenser lens 504 which are movable along forward and backward directions, a first drive controller 505 for driving the diffuser lens 503, a second drive controller 506 for driving the condenser lens 504 and a third drive controller 507 for controlling the driving of the entire unit 5.

The light emitting elements 501 includes a red LED 501A and a blue LED 501B of high luminance which are arranged side by side while being spaced apart by a specified interval along horizontal direction. Although one each of the red LED 501A and the blue LED 501B are provided in this embodiment, two or more each of them may be provided. Further, in place of the LED, a lamp such as a short arc xenon lamp or a short arc metal halide lamp and a spectral filter may be combined to construct such a light emitting element.

The diffuser lens 503 is adapted to diffuse a beam of light from the light emitting elements 501 and is integrally formed with a pair of concave lenses 503A, 503B provided in conformity with the red and blue LEDs 501A, 501B. The condenser lens 504 is adapted to project a beam of light emerging from the diffuser lens 503 toward the object in front and is integrally formed with a pair of convex lenses 504A, 504B provided in conformity with the red and blue LEDs 501A, 501B.

Below the diffuser lens 503 and the condenser lens 504 are provided the first and second drive controllers 505, 506, respectively. The first drive controller 505 includes a nut portion 505A provided in a specified position of a lens support member 503C of the diffuser lens 503, a shaft 505B screwed into the nut portion 505A and a motor 505A for drivingly rotating the shaft 505B. The shaft 505B is rotated by a torque of the motor 505C, thereby linearly moving the nut portion 505A along the shaft 505B to move the diffuser lens 503 forward and backward. The second drive controller 506 is similarly constructed to the first drive controller 505. Specifically, a shaft 506B is rotated by a torque of a motor 506C, thereby linearly moving a nut portion 506A along the shaft 506B to move the condenser lens 504 forward and backward.

The LED drive circuit 502 is a circuit for controlling a time during which power is applied to the red and blue LEDs 501A, 501B. The LED drive circuit 502 is controlled by an emission controller to be described later and changes the color temperature of light emitted toward the object (flash light and light emitted from the LEDs, hereinafter, "illumination light") by controlling the light emission times $t_{RD}$, $t_{BL}$ of the red and blue LEDs 501A, 501B according to a distance D(meter) to the object.

Figure 4:
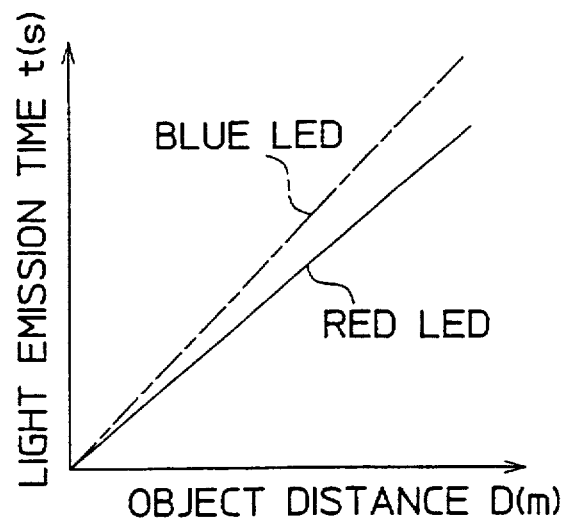
FIG. 4 is a graph showing a relationship between light emission time of LEDs and an object distance.

Specifically, the light emission time $t_{RD}$ of the red LED 501A and the light emission time $t_{BL}$ of the blue LED 501B are in proportion to the object distance D and have characteristics, for example, as shown in FIG. 4. Further, the color temperature of the illumination light varies by mixing the flash light with the light from the red LED 501A and/or from the blue LED 501B. The degree of such a variation can be changed, for example, as shown in FIG. 5 according to the respective light emission times $t_{RD}$, $t_{BL}$.

Figure 5:
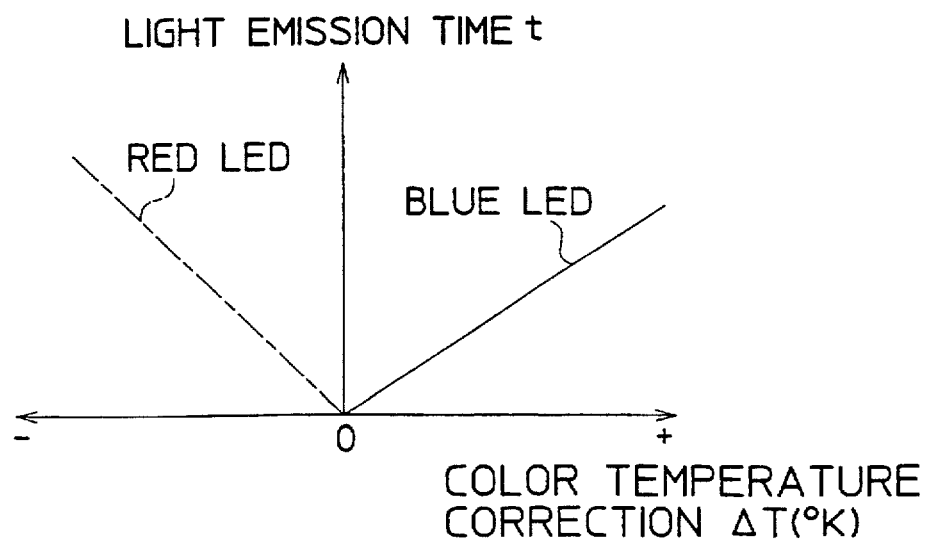
FIG. 5 is a graph showing an exemplary relationship between light emission time of LEDs and a color temperature correction amount of flash light.

FIG. 5 shows a variation of a correction amount when the color temperature of the illumination light is corrected toward (+)side or (−)side by causing only one LED to emit light. FIG. 5 shows that the color temperature of the illumination light is changed toward (+)side when only the blue LED 501B is driven, while it is changed toward (−)side when only the red LED 501A is driven.

Figure 6:
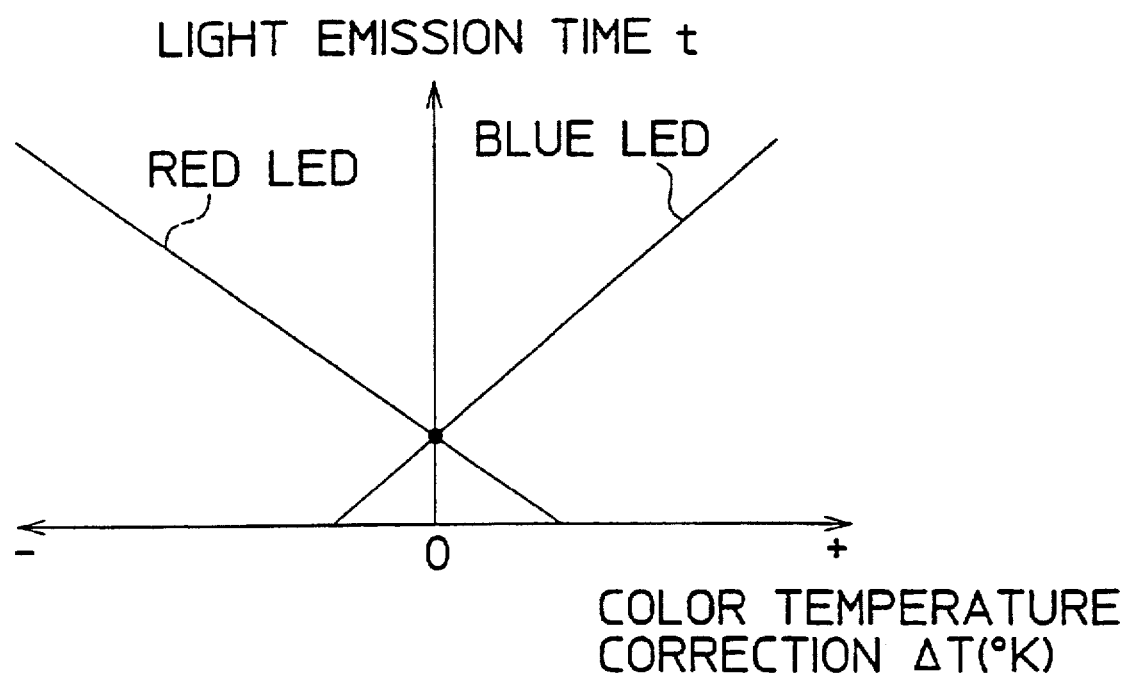
FIG. 6 is a graph showing another exemplary relationship between light emission time of LEDs and a color temperature correction amount of flash light.

The color temperature of the illumination light may be changed toward (+)side or (−)side by driving both LEDs 501A, 501B. For example, when the correction amount is small, the color temperature may be finely corrected by adjusting the mixing ratio of the lights from the red and blue LEDs 501A, 501B by driving the red and blue LEDs 501A, 501B as shown in FIG. 6.

The illumination light for the object can be continuously changed to have a desired color temperature by driving either one or both of the red and blue LEDs 501A and 501B and adjusting the respective light emission times $t_{RD}$, $t_{BL}$ and the mixing ratio. For example, the illumination light for the object is permitted to have a higher color temperature by extending the light emission time $t_{BL}$ of the blue LED 501B while being permitted to have a lower color temperature by extending the light emission time $t_{RD}$ of the red LED 501A.

The light emission times $t_{RD}$, $t_{BL}$ of the red and blue LEDs 501A, 501B are calculated based on the object distance D detected by a camera main body with which the electronic flash 1 is connected and a color temperature correction amount ΔT(°K) inputted by a photographer as described later. This calculation result is transmitted from the camera main body to the electronic flash 1. The LED drive circuit 502 controls the respective light emission times of the LEDs 501A, 501B based on the light emission times $t_{RD}$, $t_{BL}$ transmitted from the camera main body.

The third drive controller 507 includes a torque transmission mechanism including an unillustrated motor and a gear, and is adapted to move the entire LED unit 5 a very small distance along horizontal direction (X-direction) and vertical direction (Y-direction) and change an illuminating direction L of the LED unit 5. The LED unit 5 is so provided inside the electronic flash 1 as to be movable along X- and Y-directions. The third drive controller 507 translates a torque of the motor to a movement along a specified direction via the torque transmission mechanism to move the LED unit 5 a specified distance along the specified direction.

Referring back to FIG. 1, an auxiliary light emission window 6 for the distance metering is provided below the second light emission window 4, and an AF auxiliary light unit is provided in a position behind this window 6. The AF auxiliary light unit has a light emitting element including an LED for emitting infrared rays.

A battery chamber 7 (see FIG. 2) is in an upper portion of the electronic flash 1. Below the battery chamber 7 on the rear surface of the electronic flash 1 is provided a display 8. Further, an operation unit 9 for inputting a variety of pieces of information concerning flash firing is provided below the display 8. The display 8 is made of an LCD (liquid crystal display) on which the information inputted from the operation unit 9 is displayed. The operation unit 9 is provided with a switch group 901 including a plurality of keys, a power switch 902, an ON/OFF switch 903 for switchingly effecting the emission of the LEDs (color temperature correction), a test switch 904 for designating a test emission of the LED unit 5 and a test switch 905 for designating a test emission of the electronic flash 1.

Input modes for a variety of pieces of information including the coverage of the LED unit 5, a correction value of the color temperature $\Delta T(°K)$, and single color emission/multi-color emission are set, and desired data are inputted in the respective input modes by operating the switch group 901. Further, a connection unit 10 projects from the bottom surface of the electronic flash 1 to externally connect the electronic flash 1 with the camera. In this connection unit 10 are provided a plurality of connection terminals (not shown) for the data communication with the camera main body.

Although the correction amount of the color temperature is directly inputted as numeral value data in this embodiment, a correction amount which a photographer feels to bring a desired effect may be directly inputted. For example, a color temperature correction range may be divided into ±5 stages, and a switch capable of switchingly setting the color temperature in stages of −5 to +5 such as an exposure correction switch of a camera may be provided as a color temperature correction switch so as to set the color temperature in stages. Alternatively, there may be provided a color temperature correction switch having a color scale which enables a photographer to visually confirm a color temperature correction amount by feeling. A color temperature correction amount can be inputted by changing a contact position on the color scale.

Figure 7:
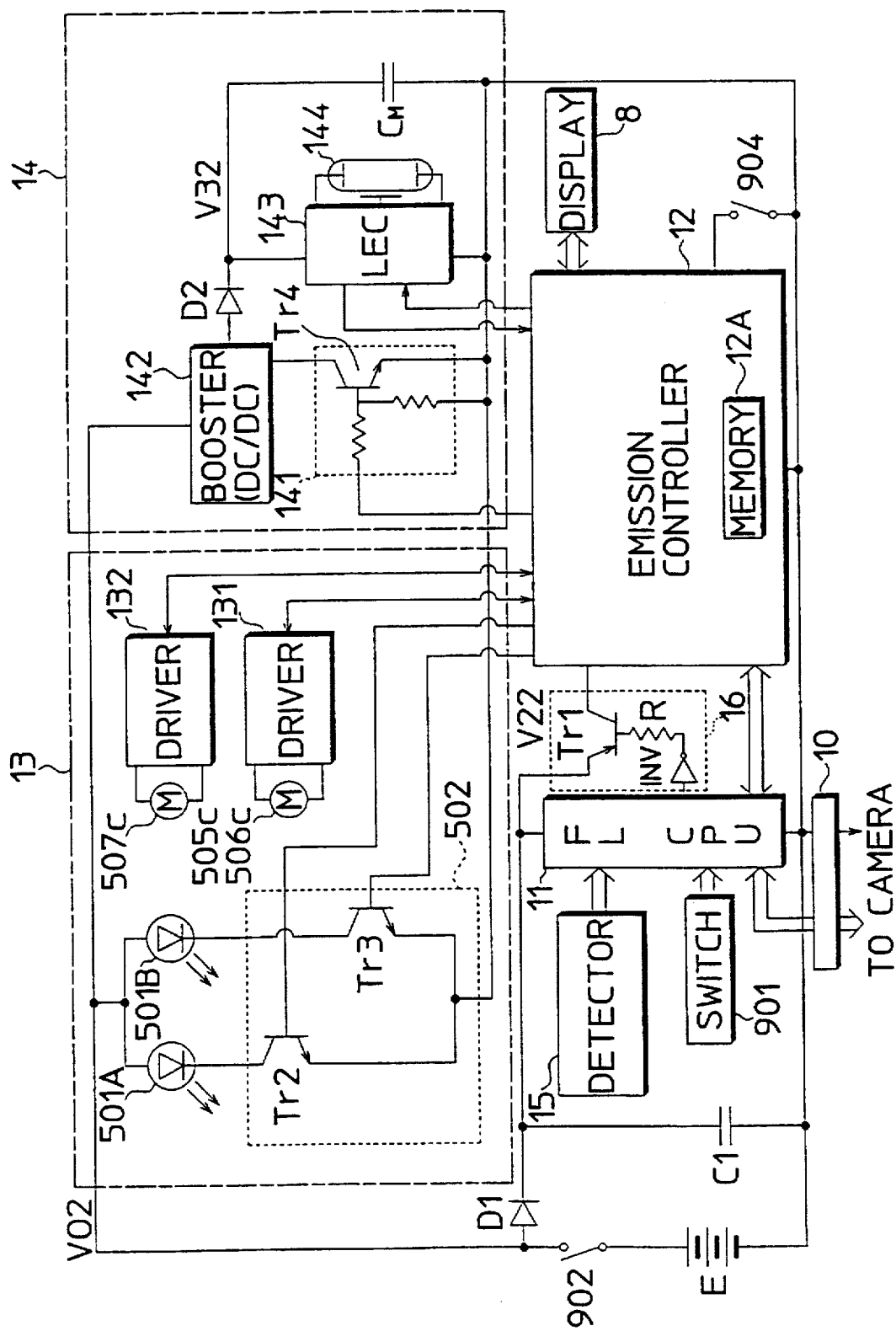
FIG. 7 is a block diagram showing a construction of the electronic flash shown in FIG. 1, in particular showing a construction concerning emission of flash light and LED light.

FIG. 7 is a block diagram showing a construction concerning the emission of the flash light and the light of the LED unit 5 of the electronic flash 1. In FIG. 7, members identical or similar to those shown in FIGS. 1 to 3 are indicated at the same reference numerals.

A flash CPU 11 is a central processing unit for centrally controlling the entire operation of the electronic flash 1. An emission controller 12 controls the emission of the flash unit 41 (see FIG. 9), the LED unit 5 and the AF auxiliary light unit 42 (see FIG. 9). The emission controller 12 has a memory 12A in which the light emission times $t_{RD}$, $t_{BL}$ of the red and blue LEDs 501A, 501B are stored. A circuit block 13 is a circuitry concerning the light emission of the LEDs included in the LED unit 5. A circuit block 14 is a circuitry concerning the emission of the flash light of the flash unit 41.

The LED drive circuit 502 is a series circuit comprised of a transistor Tr2 connected in series with the red LED 501A and a transistor Tr3 connected in series with the blue LED 501B. A series circuit comprised of the LED 501 and the LED drive circuit 502 is connected in parallel with a power battery of the electronic flash 1 set in the battery chamber 7 via a power switch 902.

The light emission times $t_{RD}$, $t_{BL}$ of the red and blue LEDs 501A, 501B (i.e., the coverage of the light from the LEDs and the color temperature correction amount) are controlled by controlling ON-times of the transistors Tr2, Tr3 of the LED drive circuit 502. The transistors Tr2, Tr3 are turned on and off by the emission controller 12.

A driver 131 in the circuit block 13 is adapted to drive the motors 505C, 506C of the first and second drive controllers 505, 506. A motor 507C is a drive source of the third drive controller 507, and a driver 132 drives this motor 507C. The drivers 131, 132 are controllably driven by the emission controller 12.

The circuit block 14 includes a light emitting circuit 143 for effecting and stopping the discharge of a xenon discharge tube 144 for generating the flash light, a main capacitor $C_M$ for storing a discharge energy of the xenon discharge tube 144, a booster circuit 142 comprised of a DC-DC converter for charging the main capacitor $C_M$, and a boost control circuit 141 comprised of a transistor switching circuit for controlling the boosting operation (i.e., the charging of the main capacitor $C_M$) of the booster circuit 142.

The boost control circuit 141 constitutes a part of an inverter circuit included in the booster circuit 142, and controls the drive (start/stop, boost voltage, etc.) of the booster circuit 142 by the ON/OFF control of the transistor Tr4. The transistor Tr4 in the boost control circuit 141 is controllably turned on and off by the emission controller 12. A series circuit constructed by the booster circuit 142 and the boost control circuit 141 is connected in parallel with a power battery E via a power switch 902. With an output terminal of the booster circuit 142 is connected the light emitting circuit 143 and the main capacitor $C_M$ via a rectifying diode D2.

In flash photographing, a power voltage V02 is boosted to a specified charging voltage V32 by the booster circuit 142 and applied to the main capacitor $C_M$. In this way, electrical energy necessary for the flash firing is stored in the main capacitor $C_M$.

The light emitting circuit 143 controls the discharge of the electrical energy stored in the main capacitor $C_M$ to the xenon discharge tube 144. Start and stop timings of the discharge of the energy stored in the main capacitor $C_M$ are controlled by the emission controller 12.

A projection angle detector circuit 15 detects a set position of the xenon discharge tube 144. A member for moving the xenon discharge tube 144 is provided with an encoder for the position detection, and the projection angle detector circuit 15 detects position information (2-bit signal) of the xenon discharge tube 144 from this encoder. This detection signal is inputted to the emission controller 12 via the flash CPU 11. The emission controller 12 judges an object distance (or angle) reachable by the coverage of the flash light based on the position information of the xenon discharge tube 144, and controllably sets a projection angle of the flash light of the flash unit 41 at a specified projection angle corresponding to the object distance (or focal length) using the judgment result and information on the object distance (or focal length) transmitted from the camera connected. Information on the projection angle of the flash light is displayed on the display device 8.

A diode D1 is adapted to prevent a reverse charging. A capacitor C1 is a large capacity capacitor for reducing a fall of the drive voltage to the flash CPU 11 by the operation of the booster circuit 142.

A circuit 16 comprised of a transistor Tr1, an inverter INV and a resistor R is a control circuit for stably controlling a drive voltage V22 of the emission controller 12. The flash CPU 11 outputs an ON/OFF drive signal to the transistor Tr1 via the inverter INV and keeps the drive voltage to be supplied to the emission controller 12 at V22.

Figure 8:
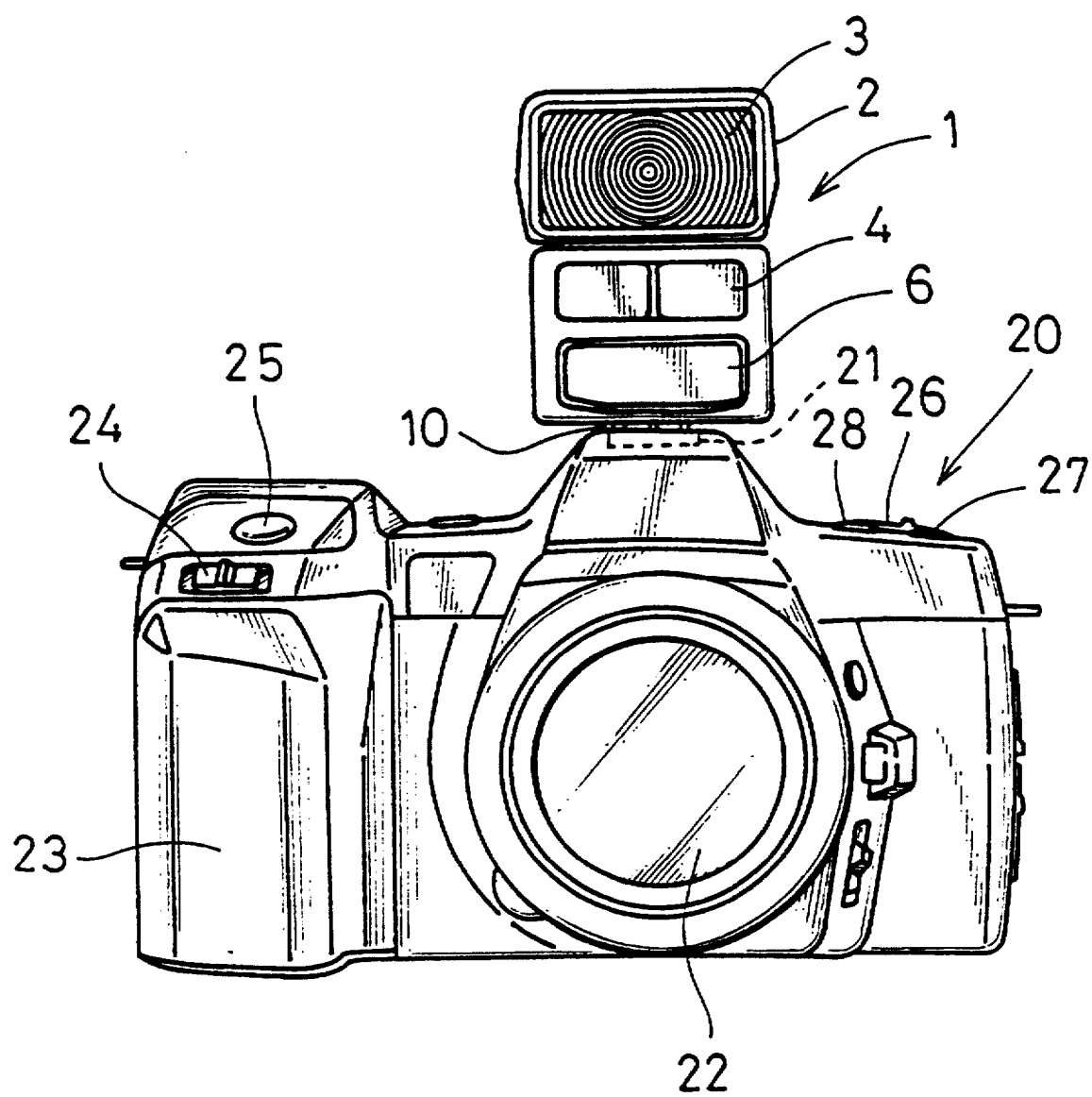
FIG. 8 is a diagram showing an external construction of a camera provided with the electronic flash shown in FIG. 1.

FIG. 8 is a diagram of a flash photographing system which is assembled by connecting the electronic flash 1 with a camera and capable of changing the color temperature of the flash light.

A camera 20 is a single-lens reflex camera, and a connection unit 21 with which the electronic flash 1 is externally connected is provided in the middle of an upper portion of the main body of the camera 20. The electronic flash 1 and the camera 20 are externally connected by coupling the connection units 21 and 10. The connection unit 21 is also provided with a plurality of connection terminals so as to correspond to the connection terminals of the connection unit 10. By coupling the connection units 10, 21, the electronic flash 1 and the camera 20 are mechanically and electrically connected.

A taking lens 22 is provided substantially in the middle of the front surface of the camera 20, a grip 23 is so formed as to project at a left end portion of the front surface. An up/down switch 24 for selecting a desired data from a plurality of data set in advance in various modes and a shutter release button 25 are provided in an upper portion of the grip 23. An unillustrated LCD device is provided in a position behind the shutter release button 25. On the LCD device are displayed a variety of pieces of information (including the photographing mode, shutter speed, aperture value, continuous/one-shot film drive, the number of exposures, film sensitivity) concerning the photographing of the camera.

A main switch 26 is provided in the upper surface of the right end of the camera main body. A mode selection switch 27 is provided in a position before the main switch 26, and a function switch 28 is provided adjacent to the mode selection switch 27. The mode selection switch 27 is a switch for selecting the photographing mode such as a program mode, a shutter speed priority mode and an aperture priority mode. When the up/down switch 24 is operated while the mode selection switch 27 is kept pressed, the photographing mode displayed on the LCD device is cyclically changed and a desired photographing mode is set by displaying it.

The function switch 28 is a switch for selectively setting the shutter speed and the aperture value in the shutter speed priority mode and the aperture priority mode and a correction value in an exposure correction value setting mode. When the up/down switch 24 is operated in a specified mode while the function switch 28 is kept pressed, a plurality of data such as the shutter speed, aperture value and exposure correction value set in advance and to be displayed on the LCD device are cyclically changed, and a desired data is selectively set by displaying it.

Figure 9:
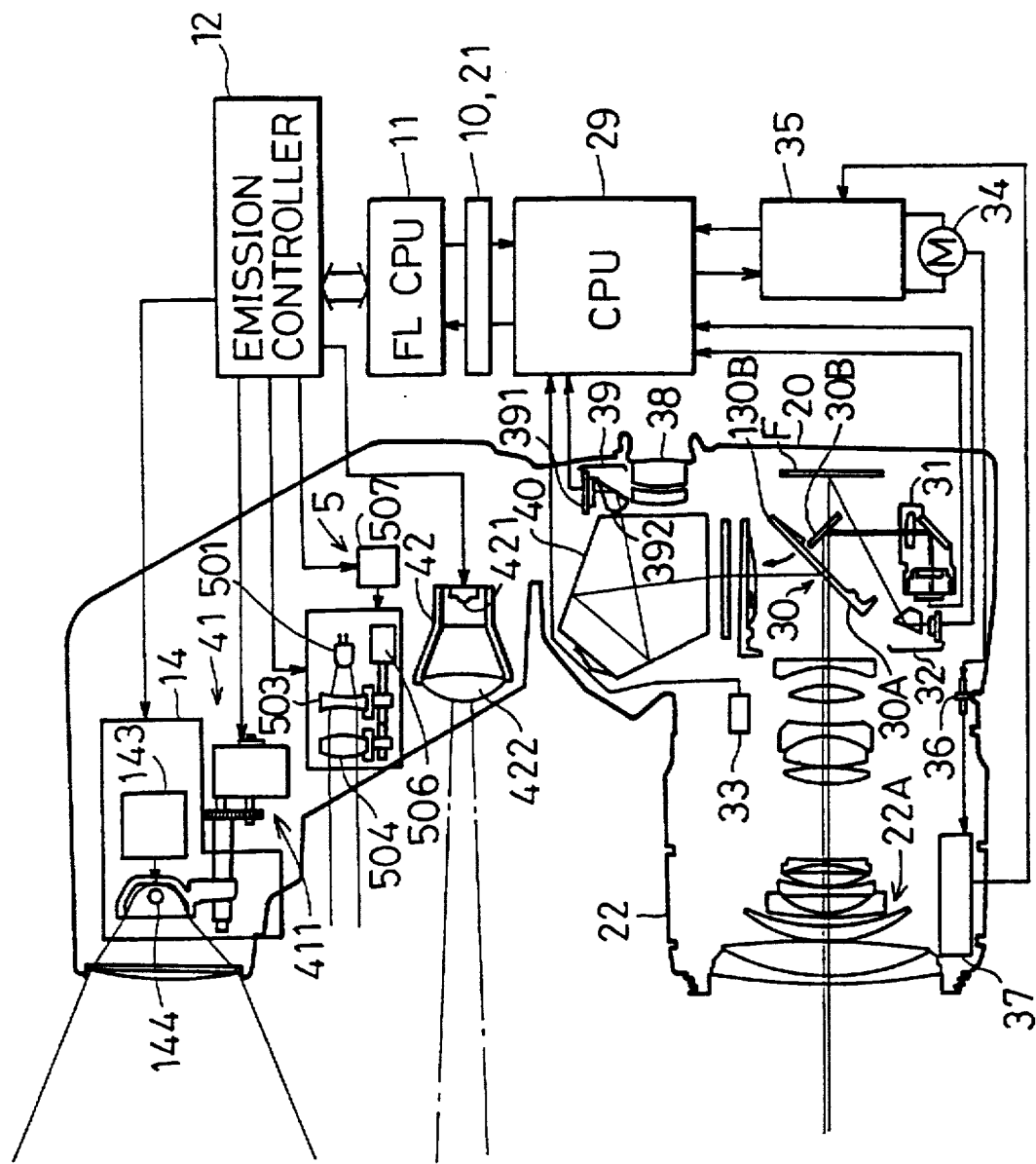
FIG. 9 is a schematic diagram showing a combination of the electronic flash and the camera.

FIG. 9 is a block construction diagram of the flash photographing system including the electronic flash 1 and the camera 20. In FIG. 9, the same elements as those described with reference to FIGS. 1 to 3, 7 and 8 are indicated at the same reference numerals.

In the main body of the camera 20 is provided a camera controller 29 (hereinafter, referred to as "CPU 29") constructed by a microcomputer for centrally controlling the photographing operation of the camera 20. This CPU 29 can communicate with the flash CPU 11 in the electronic flash 1 via the connection terminals provided in the connection units 10, 21.

The camera 20 includes a mirror assembly 30 which is located behind the taking lens 22 and includes a main mirror 30A and an auxiliary mirror 30B, and a film F is located behind the mirror assembly 30. Below the mirror assembly 30 are provided an AF sensor module 31 for the automatic focusing (AF) control and a light meter 32 for the TTL light adjustment. The AF sensor module 31 detects information on a focus position (hereinafter, "AF data") from an object light image introduced thereto via the taking lens 22, the main mirror 30A and the auxiliary mirror 30B. The light meter 32 receives the flash light reflected by a film surface and detects an emission stop timing of the flash light using this light reception data in flash photographing. The AF data and the emission stop timing signal are inputted to the CPU 29.

The CPU 29 calculates a control data for driving a focusing lens group 22A of the taking lens 22 from a present lens position and to an in-focus position using lens information peculiar to the taking lens 22 which is read from a lens ROM provided in the taking lens 22. This control data is inputted to a motor control circuit 35 for controlling the drive of an AF motor 34 as a driving source of the focusing lens group 22A provided in the camera main body.

A torque of the AF motor 34 is transmitted to a driving member 37 of the focusing lens group 22A via an AF coupler 36. The motor control circuit 35 drives the AF motor 34 based on the control data to move the focusing lens group 22A to the in-focus position, thereby automatically focusing the taking lens 22.

On the other hand, the emission stop timing signal is inputted to the emission controller 12 via the connection units 10, 21. The emission controller 12 forcibly stops the discharge of the xenon discharge tube 144 in response to the emission stop timing signal, thereby controllably adjusting the light emission amount of the electronic flash 1 to a specified light emission amount.

Above a viewfinder optical system 38 of the camera 20 is provided a light metering circuit 39 for detecting an object brightness. The light metering circuit 39 is provided with an AE (Automatic Exposure) sensor 391 comprised of light receiving elements such as SPCs and an AE optical system 392 for introducing a reflected light from the object introduced via the taking lens 22, the main mirror 30A and a triangular roof prism 40 further to the AE sensor 391, and is adapted to detect the object brightness by receiving the reflected light from the object. This object brightness data is inputted to the CPU 29 to be used for the judgment as to whether or not the electronic flash 1 needs to be fired.

The flash unit 41 in the electronic flash 1 is, as described above, provided with the xenon discharge tube 144 movable along forward and backward directions, and the movement of the xenon discharge tube 144 is controlled by a driving member 411 constructed by a motor and a screw member.

The AF (Automatic Focus) auxiliary light unit 42 is provided with an LED 421 for emitting infrared rays and a condenser lens 422. The drive of the first to third drive controllers 505 to 507 of the LED unit 5 and the emission of the AF auxiliary light unit 42 are controlled in accordance with control signals from the emission controller 12.

In flash photographing, when the shutter release button 25 is pressed by a half stroke, the AF and AE processings for the photographing preparation are performed. In the AF processing, the AF data is detected by the AF sensor module 31 and the AF control is performed based on the AF data to obtain a focusing condition of the taking lens 22. Upon the completion of the AF control, the motor control circuit 35 outputs the information on the focusing condition to the CPU 29.

This information on the focusing condition is transferred via the CPU 29 to the flash CPU 11, which calculates a projection direction of the light from the LED unit 5 using the received information (i.e., an object distance information) and calculates a control value for the third drive controller 507 based on the calculation result. The flash CPU 11 calculates the control values of the first and second drive controllers 505, 506 based on the information on the projection range (projection angle) of the LED unit 5 which is inputted from the operation unit 9. The flash CPU 11 also calculates the respective light emission times $t_{RD}$, $t_{BL}$ of the LEDs 501A, 501B using the focusing condition information transferred from the CPU 29 and the color temperature correction value ΔT inputted from the operation unit 9.

The above control values are outputted, respectively, to the first to third drive controllers 505 to 507 via the emission controller 12. By adjusting the positions of the diffuser lens 503 and the condenser lens 504 and the axis of the LED unit 5 using these control values, the projection direction and the projection range of the light (continuous light) emitted from the LED unit 5 are set within specified ranges.

In the AE processing, whether or not the electronic flash 1 needs to be fired is judged based on the object brightness data detected by the light metering circuit 39 and the exposure control values (aperture value and shutter speed) are set. The object brightness data and the judgment result as to the necessity of flash firing are outputted to the flash CPU 11.

The flash CPU 11 calculates a zoom position of the xenon discharge tube 144 and a flash light amount based on the object distance and object brightness information sent from the CPU 29 when the flash firing is necessary, and inputs these calculation results to the emission controller 12 for the preparation of the flash firing.

Thereafter, when the shutter release button 25 is pressed by the full stroke, thereby inputting a release signal to the CPU 29, this release signal is transferred to the flash CPU 11. Thereupon, while the flash CPU 11 causes the LED unit 5 to start emitting light via the emission controller 12 in synchronism with the opening of the shutter, the xenon discharge tube 144 of the flash unit 41 is caused to fire at a flash firing timing sent from the CPU 29.

The flash CPU 11 stops the emission of the LEDs 501A, 501B upon the elapse of the light emission times $t_{RD}$, $t_{BL}$ after the start of the emission of the LED unit 5. When an emission stop timing signal is inputted from the camera main body, the flash CPU 11 forcibly stops the firing of the flash unit 41.

Next, control in changing of the color temperature of the illumination light for an object in flash photographing of the flash photographing system is briefly described with reference to flowcharts of FIGS. 10 to 12.

Figure 10:
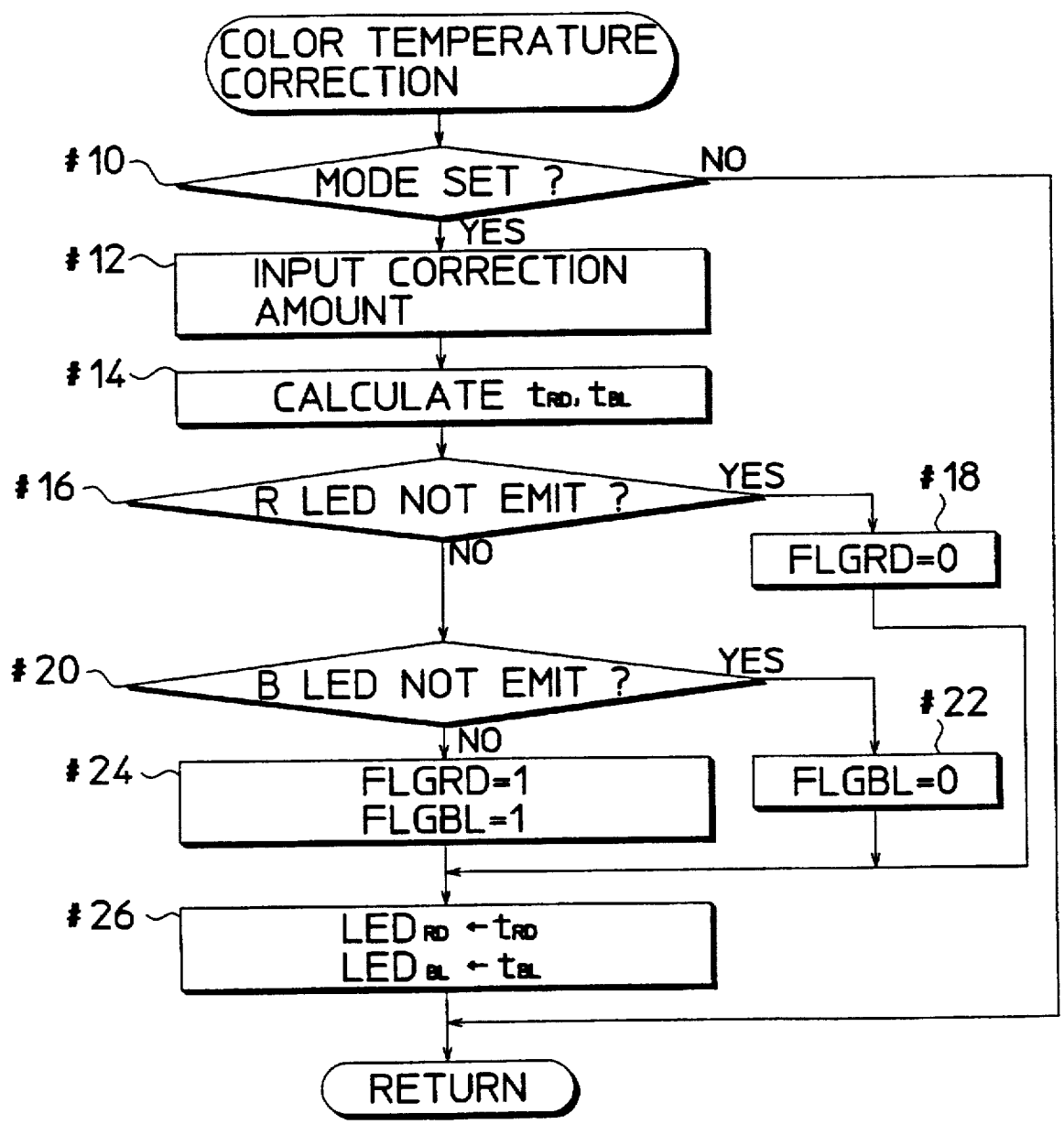
FIG. 10 is a flowchart showing a color temperature correction processing of the electronic flash shown in FIG. 1.

The flowchart of FIG. 10 is for the color temperature correction processing. This flowchart is executed in the flash CPU 11.

When the color temperature correction value input mode is set by the operation unit 9 of the electronic flash 1 (YES in Step #10) and the color temperature correction amount ΔT (°K) is inputted by the switch group 901 (Step #12), the light emission times $t_{RD}$, $t_{BL}$ of the red and blue LEDs 501A, 501B are calculated based on this color temperature correction amount ΔT and the object distance D sent from the CPU 29 of the camera 20 (Step #14). This calculation is made based on a relationship between the light emission time t and the object distance D shown in FIG. 4 and a relationship between the light emission time t and the color temperature correction amount ΔT shown in FIG. 5. The light emission time t is in proportion to the object distance D and the color temperature correction amount ΔT and expressed: $t_{RD}$= k1·ΔT, $t_{BL}$=k2·ΔT (k1, k2: proportion coefficients, k2>k1).

Subsequently, it is judged whether one of the LEDs 501A, 501B is allowed to emit light based on the calculated light emission times $t_{RD}$, $t_{BL}$ (Steps #16, #20). When the red LED 501A is not allowed to emit light ($t_{RD}$=0) (YES in Step #16), a flag FLGRD is reset to "0" (Step #18). When the blue LED 501B is not allowed to emit light ($t_{BL}$=0) (YES in Step #20), a flag FLGBL is reset to "0" (Step #22). When both LEDs 501A and 501B are allowed to emit light (NO in Step #16, #20), the flags FLGRD, FLGBL are both set to "1" (Step #24).

The calculated light emission times $t_{RD}$, $t_{BL}$ are stored in a memory 12A provided in the emission controller 12 (Step #26), completing the processing. The light emission time $t_{RD}$ is stored in an area of a label $LED_{RD}$ in the memory 12A, whereas the light emission time $t_{BL}$ is stored in an area of a label $LED_{BL}$ in the memory 12A.

Figure 11:
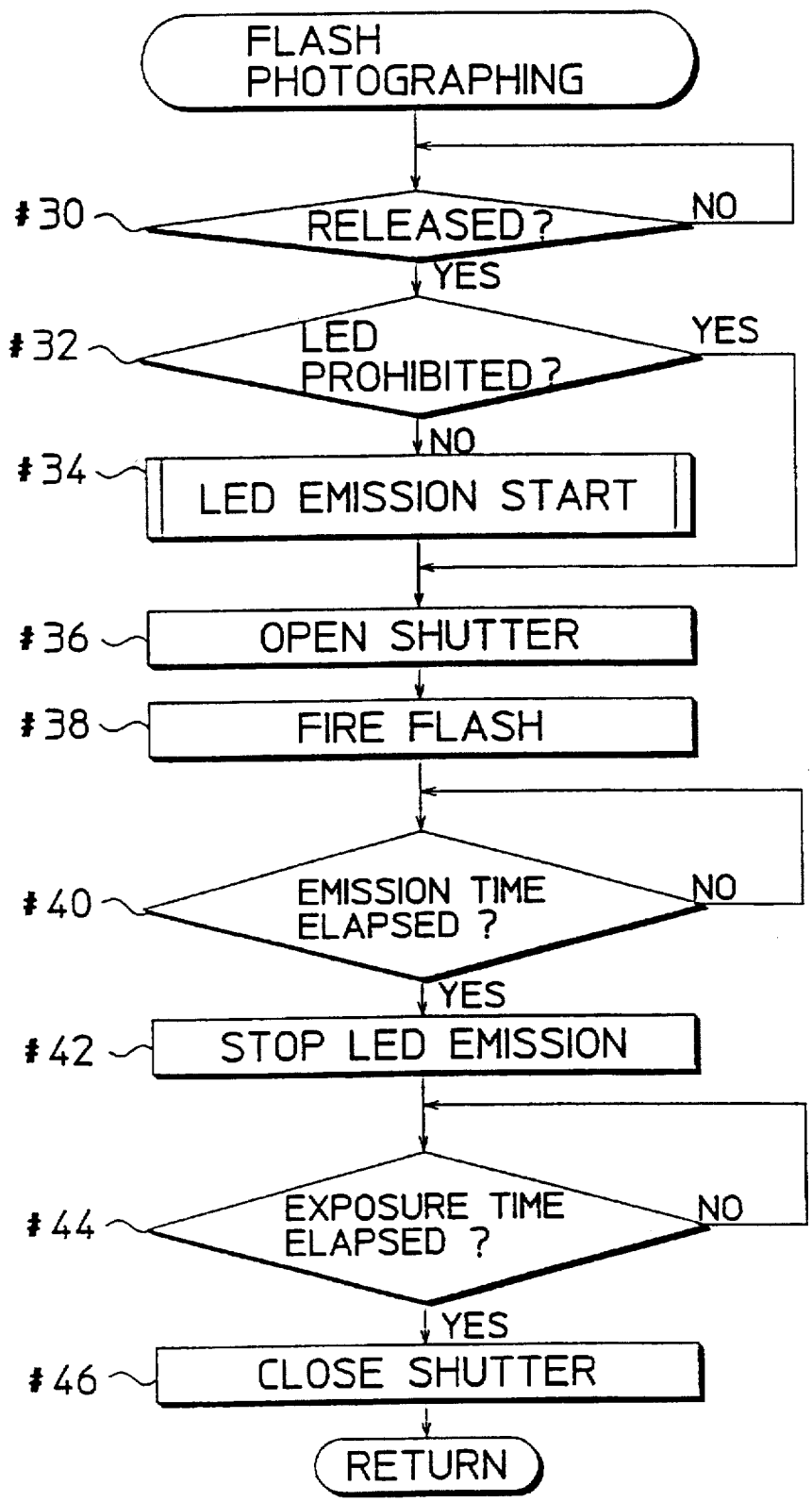
FIG. 11 is a flowchart showing a light emission processing in flash photographing in the camera shown in FIG. 8.
Figure 12:
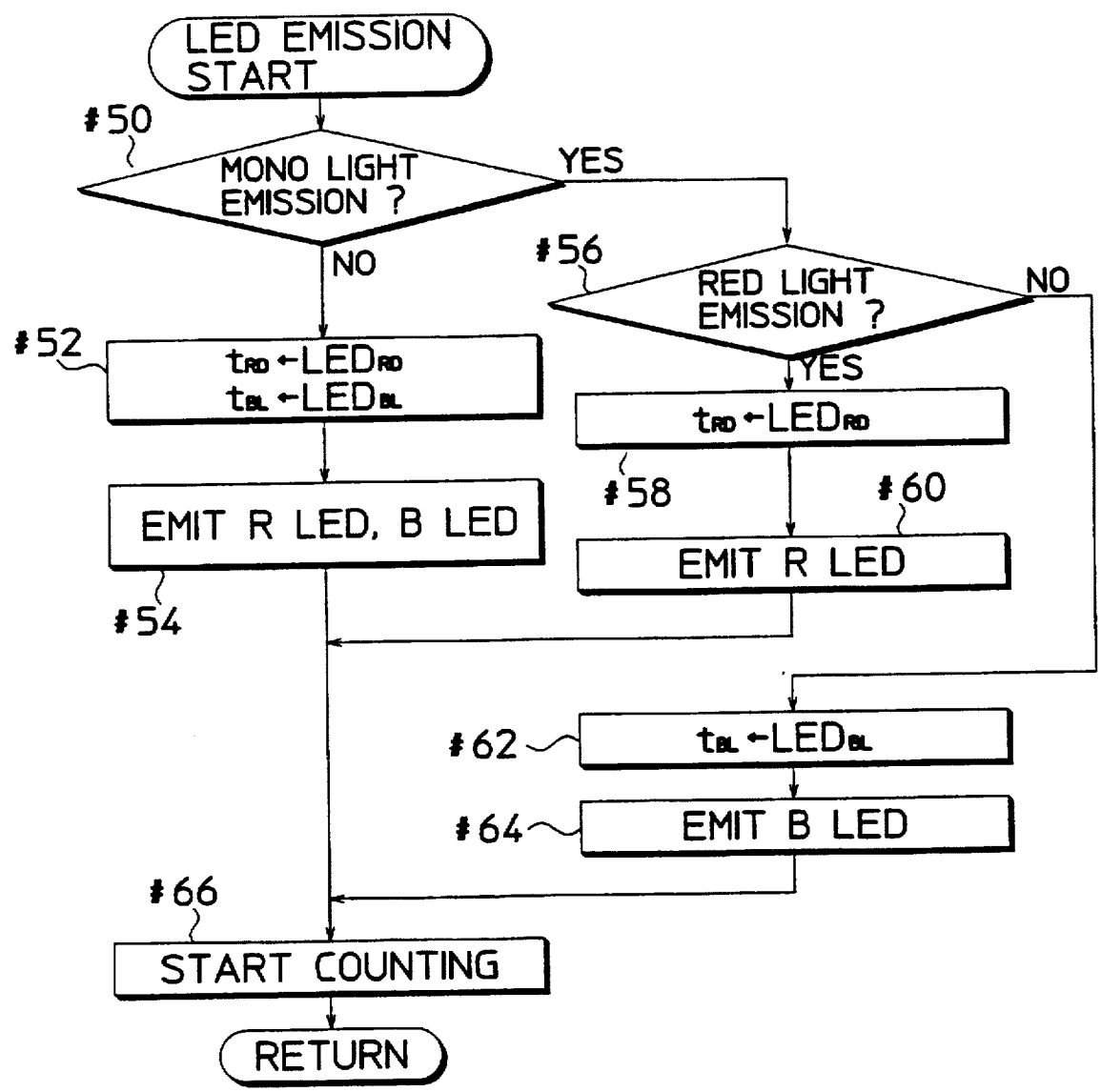
FIG. 12 is a flowchart showing a subroutine "LED Emission Start" of the flowchart shown in FIG. 11.

FIG. 11 is a flowchart for the light emission processing in flash photographing, and FIG. 12 is a flowchart showing a subroutine "LED Emission Start". The flowcharts of FIGS. 11 and 12 are executed through the data communication of the CPU 29 of the camera 20 and the flash CPU 11 of the electronic flash 1.

When the photographing preparation is completed and the shutter release button 25 is pressed by the full stroke to input an exposure instruction (YES in Step #30), the CPU 29 judges while communicating with the flash CPU 11 whether an LED emission prohibition mode is set (Step #32). This mode is set by a photographer using the switch 903.

Unless the LED emission prohibition mode is set (NO in Step #32), an LED emission start signal is outputted to the flash CPU 11 to start the emission of the red and blue LEDs 501A, 501B (Step #34).

Upon the receipt of the LED emission start signal, the flash CPU 11 judges whether a monochromatic light emission is to be performed based on the set state of the flags FLGRD, FLGBL (Step #50). Unless the monochromatic light emission is to be performed (NO in Step #50), an instruction is given to the emission controller 12 to cause the red and blue LEDs 501A, 501B to emit light. The emission controller 12 reads the light emission times $t_{RD}$, $t_{BL}$ from the areas of the labels $LED_{RD}$, LEDBL of the memory 12A (Step #52) and starts counting the light emission times $t_{RD}$, $t_{BL}$ at the same time causing the LEDs 501A, 501B to emit light (Steps #54, #56).

On the other hand, if the monochromatic light emission is to be performed (YES in Step #50), it is further judged whether a red light emission is to be performed (Step #56). In the case of the red light emission (YES in Step #56), an instruction is given to the emission controller 12 to cause the red LED 501A to emit light. In the case of the blue light emission (NO in Step #56), an instruction is given to the emission controller 12 to cause the blue LED 501B to emit light.

In the case of the red light emission, the emission controller 12 reads the light emission time $t_{RD}$ from the memory 12A (Step #58) and starts counting the light emission time $t_{RD}$ at the same time when causing the red LED 501A to emit light (Steps #60, #66). In the case of the blue light emission, the emission controller 12 reads the light emission time $t_{BL}$ from the memory 12A (Step #62) and starts counting the light emission time $t_{BL}$ at the same time when causing the blue LED 501B to emit light (Steps #64, #66).

Upon the start of the emission of the LED(s), the CPU 29 starts an exposure by opening the shutter (Step #36) and outputs a flash firing start signal to the flash CPU 11 at a specified timing (Step #38). Upon the receipt of the flash firing start signal, the flash CPU 11 causes the xenon discharge tube 144 to fire via the emission controller 12.

Upon the elapse of the light emission times $t_{RD}$, $t_{BL}$ (YES in Step #40), the emission of the red and blue LEDs 501A, 501B is stopped (Step #42). Further, upon the elapse of a specified exposure time (YES in Step #44), the shutter is closed, thereby completing the flash photographing (Step #46).

This embodiment relates to the flash photographing system capable of changing the color temperature of the flash light by assembling the electronic flash 1 and the camera 20. However, the invention is also applicable to a camera capable of changing the color temperature of the flash light by providing an LED unit in a camera having a built-in flash.

Figure 13:
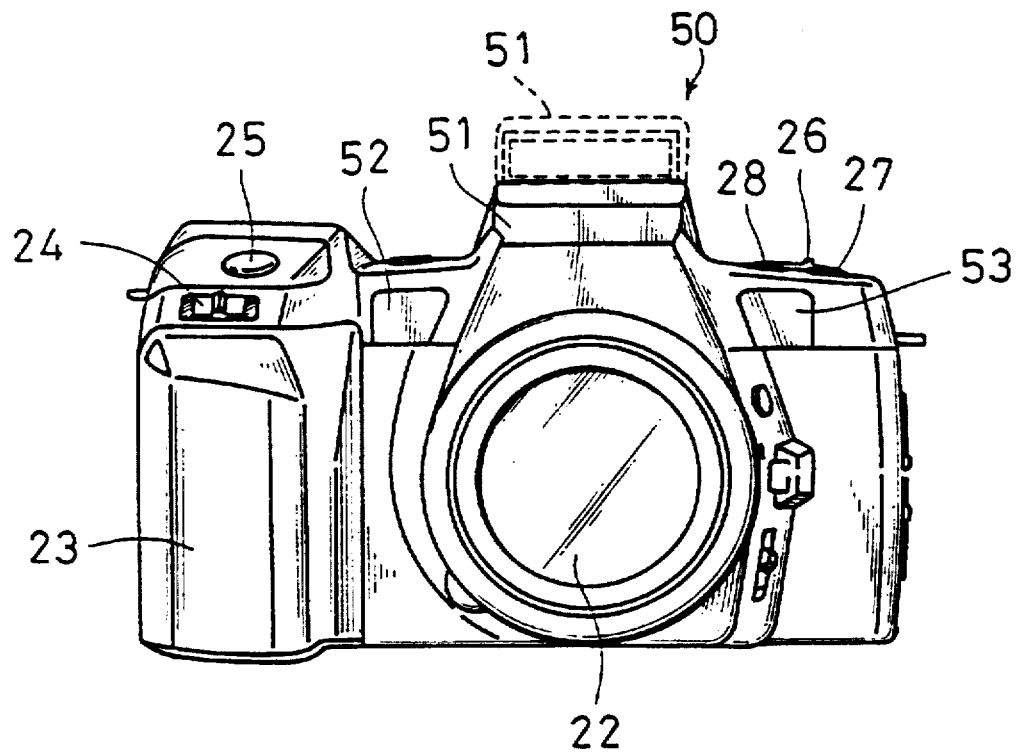
FIG. 13 is a front view showing an external configuration of a camera provided with an electronic flash capable of changing color temperature according to a second embodiment of the invention.
Figure 14:
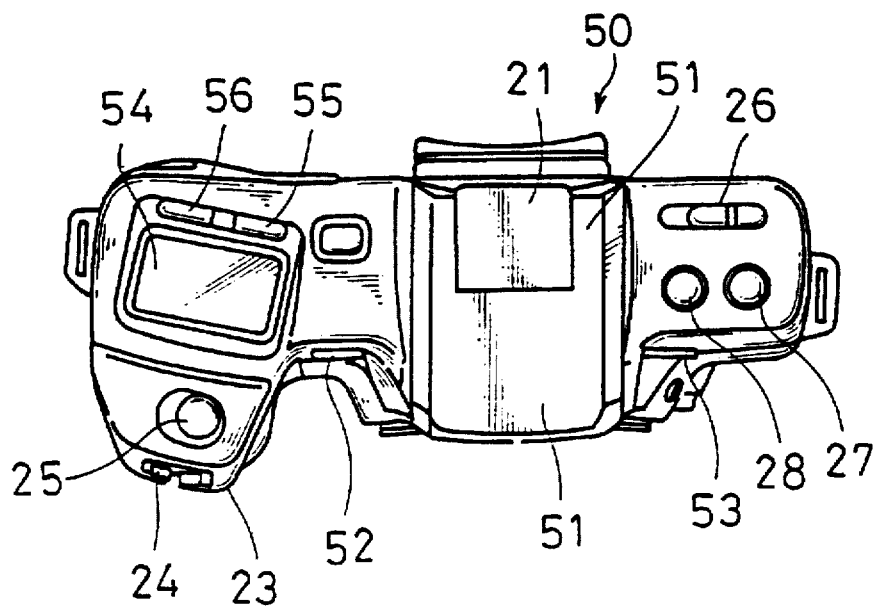
FIG. 14 is a top plan view of the camera shown in FIG. 13.

FIG. 13 is a front view showing an external configuration of a camera provided with an electronic flash capable of changing the color temperature according to a second embodiment of the invention, and FIG. 14 is a top plan view of a main body of this camera. In FIG. 14, the exchangeable taking lens 22 is deleted.

Basically, a camera 50 includes a built-in flash 51 of pop-up type, LED units 52, 53, and key switches 55, 56 for inputting information used for the emission control of the LED units 52, 53 in addition to the construction of the camera 20 shown in FIG. 8.

The built-in flash 51 serving as a primary emission unit, and is provided in the middle of an upper portion of the camera main body, and the LED units 52, 53 serving as an auxiliary emission unit are provided in positions obliquely upward from the taking lens 22 to the left and right. The LED units 52, 53 have the same construction as the LED unit 5 shown in FIG. 33. However, the positions of the red and blue LEDs 501A, 501B of the LED unit 53 are transversely reversed. Accordingly, the blue LEDs 501B of the LED units 52, 53 are arranged inside (toward the taking lens 22), and the red LEDs 501A thereof are arranged outside.

As shown in FIG. 14, a pair of selection keys 55, 56 are provided along a long side at the rear side of a rectangular LCD device 54. An input mode for color temperature correction value is selected by the selection key 55, whereas a projection angle input mode for the LED units 52, 53 are selected by the selection key 56.

The color temperature correction value input mode is displayed as a symbol mark on the LCD device 54, and this mode is set by selecting this symbol mark by the selection key 55. If the up/down switch 24 is operated while the function switch 28 is pressed in this mode, data on the preset color temperature correction amounts ΔT to be displayed on the LCD device 54 are switched in specified steps. A desired correction amount ΔT can be set by displaying it.

The projection angle input mode for the LED units 52, 53 is displayed as a symbol mark on the LCD device 54, and this mode is set by selecting this symbol mark by the selection key 56. If the up/down switch 24 is operated while the function switch 28 is pressed in this mode, data on the preset projection angles θ to be displayed on the LCD device 54 are switched in specified steps. A desired projection angle θ can be set by displaying it.

The camera 50 differs from the flash photographing system shown in FIG. 8 in that the externally connected electronic flash 1 is replaced by the built-in flash 51. Accordingly, if the flash CPU 11 is replaced by the CPU 29 of the camera 50 for the circuit block in the camera 50 concerning the flash photographing, a construction similar to the one shown in the block diagram of FIG. 7 can be obtained. The color temper‑ ure correction processing, the emission control of the LED units 52, 53 and the flash photographing control can be performed according to a method similar to the one defined by the flowcharts of FIGS. 10 to 12. Since the circuit block of the camera 50 for the flash photographing and the color temperature correction processing in flash photographing, etc. are similar to those described above, no judgment is given thereon.

Although the aforementioned electronic flash 1 is an electronic flash for usual flash photographing, a light emitting device such as an LED may be provided on the so-called ring flash for close-up photographing to correct the color temperature of the illumination light.

Figure 15:
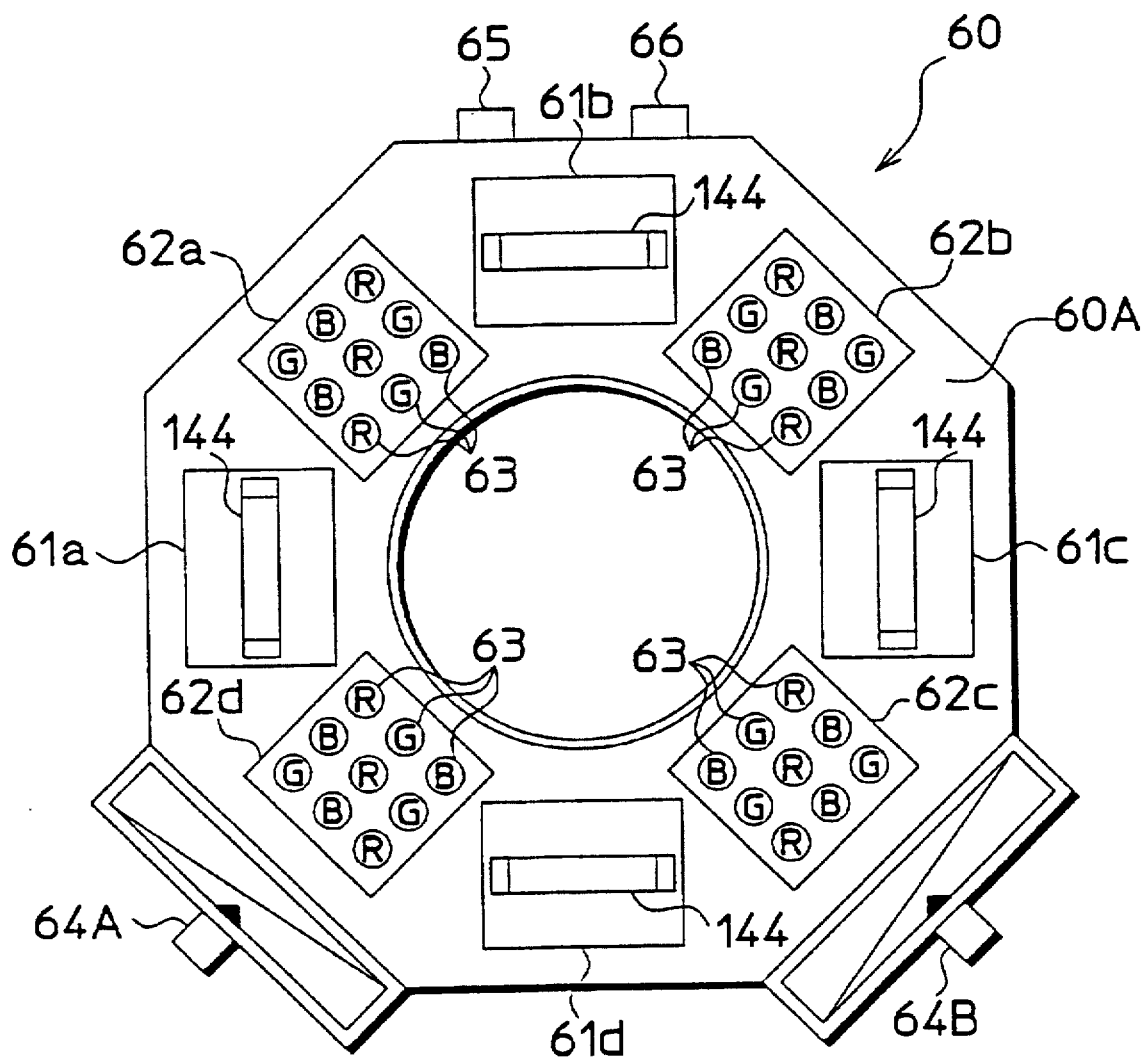
FIG. 15 is a front view of a ring electronic flash capable of changing color temperature according to a third embodiment of the invention, this electronic flash being adaptable for close-up photographing.

FIG. 15 is a front view of a ring flash for close-up photographing which is capable of changing the color temperature, according to a third embodiment of the invention.

A ring flash 60 includes a ring-shaped light projection portion 60A having a round inner periphery and an octagonal outer periphery. The light projection portion 60A is provided with four flash units 61a to 61d serving as a primary emission unit and four LED units 62a to 62d serving as an auxiliary emission unit. The flash units 61a, 61c are provided along the left and right sides of the light projection portion 60A, and the flash units 61b, 61d are provided along the upper and lower sides of the light projection portion 60A. The LED units 62a, 62b are provided along the upper oblique sides of the light projection portion 60A, and the LED units 62c, 62d are provided along the lower oblique sides of the light projection portion 60A.

Figure 16:
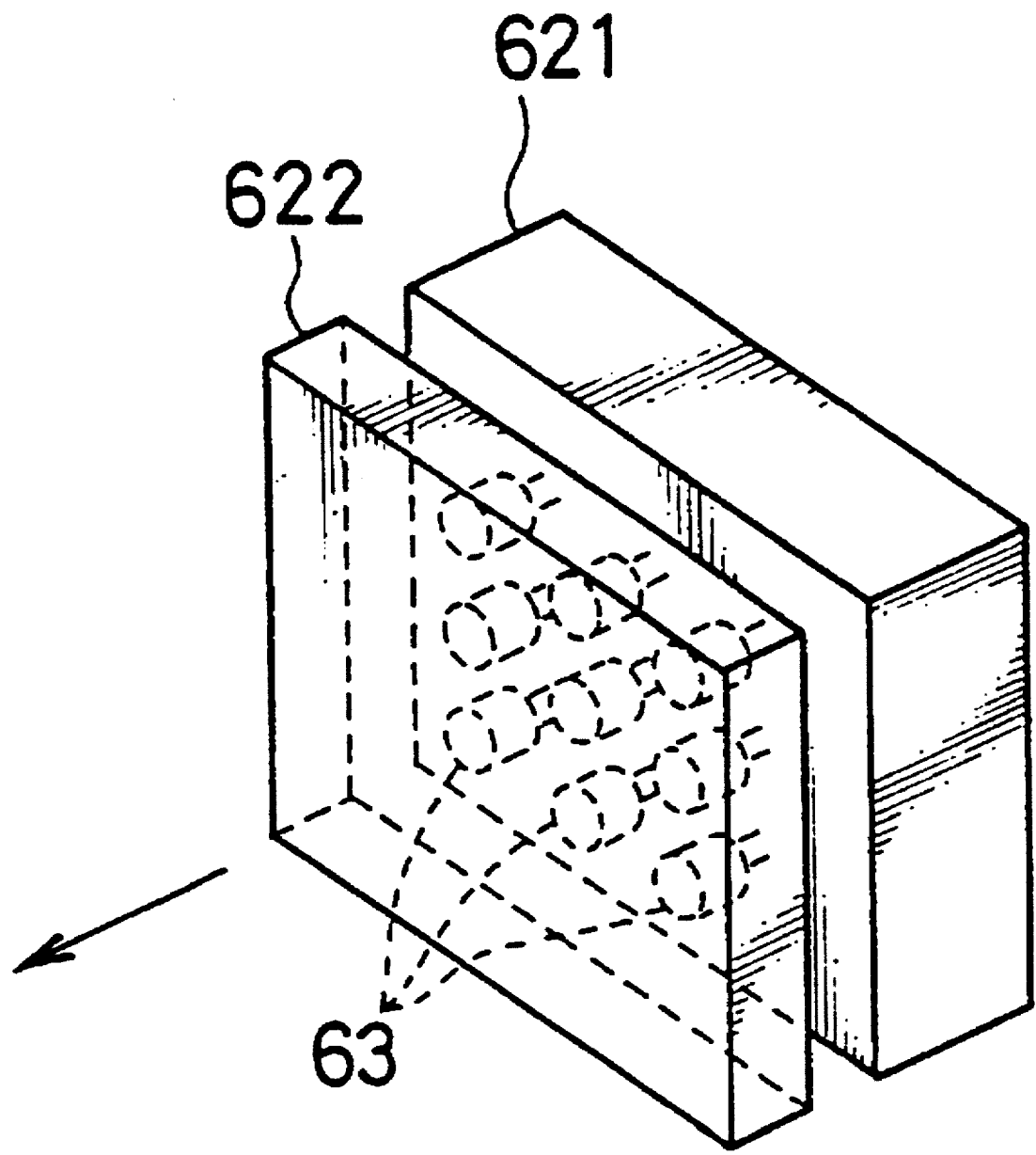
FIG. 16 is a perspective view showing a schematic construction of an LED unit.

The flash units 61a to 61d have an identical construction and each have a xenon discharge tubes 144 substantially in the middle of a light emission window thereof. The LED units 62a to 62d also basically have an identical construction except the arrangement of LEDs 63 of the respective colors R (red), G (green), B (blue). As shown in FIG. 16, each LED unit has three each of LEDs 63 of the respective colors R, G, B which are arranged in a 3×3 matrix, a drive circuit 621 for driving the LEDs 63 to emit light, and an optical system for gathering lights from the LEDs 63 to a specified projection range. As shown in FIG. 15, the arrangement of the LEDs 63 of the LED units 63b, 63c on the right side and that of the LED units 63a, 63d on the left side are a mirror image with respect to a vertical center line; and the arrangement of the LEDs 63 of the LED units 63a, 63b on the upper side and that of the LED units 63c, 63d on the lower side are a mirror image with respect to a horizontal center line.

The color arrangement of the LEDs 63 in this embodiment is merely an exemplary arrangement for uniformly dispersing the positions of the light sources of the respective colors R, G, B. Other arrangements may also be adopted provided that the positions of the light sources of the respective colors satisfy the above relationship.

Figure 17:
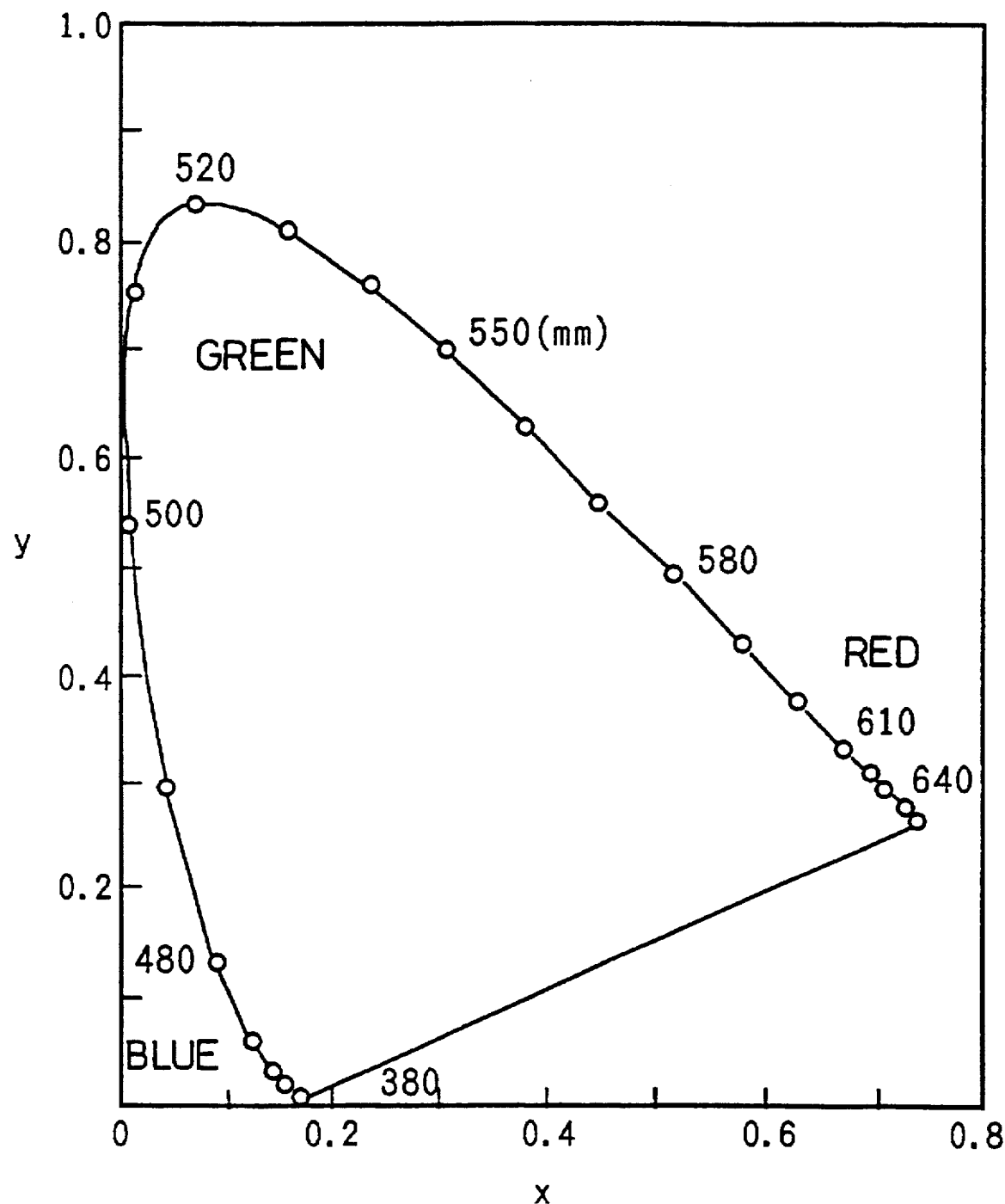
FIG. 17 is a chromaticity diagram.

Color temperature correction levers 64A, 64B for correcting the color temperature of the illumination light project from the side surfaces of the light projection portion 60A along the upper oblique sides. The lever 64A is adapted to set an x-coordinate of a chromaticity diagram of FIG. 17, whereas the lever 64B is adapted to set a y-coordinate of this chromaticity diagram. When both levers 64A, 64B are set in center positions, chromaticity (x, y) is set at (0.5, 0.5). The chromaticity falls below 0.5 when the levers 64A, 64B are slid to the left from the center positions, while exceeding 0.5 when the levers 64A, 64B are slid to the right from the center positions.

On the side surface of the light projection portion 60A along the upper side thereof are provided a monitor switch 65 for displaying an illumination light after the color temperature adjustment and an emission prohibition switch 66 for prohibiting the emission of the LED.

Although the color temperature correction amount is directly inputted as a numerical data in the ring flash as well, the color temperature correction levers 64A, 64B may be provided, for example, with a color scale which allows a photographer to confirm a color after the correction, so that he/she can input a correction amount based on his feeling by changing the position of the lever on the color scale.

Figure 18:
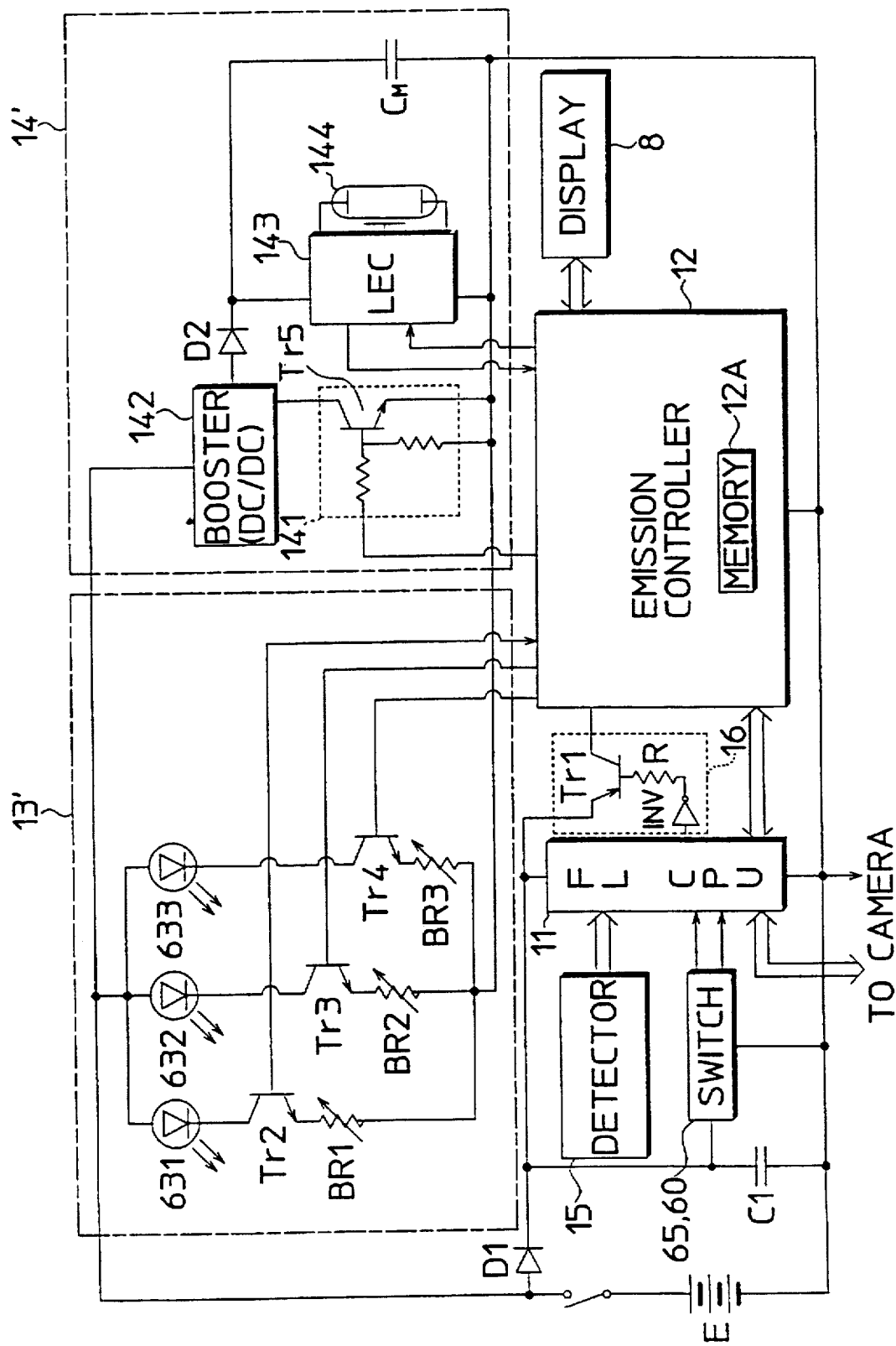
FIG. 18 is a block diagram showing a construction of the ring electronic flash shown in FIG. 15.

FIG. 18 is a block construction diagram of the ring flash. The basic construction shown in FIG. 18 is the same as the block construction of the flash photographing system shown in FIG. 7. Accordingly, elements having the same function as those shown in FIG. 7 are indicated at the same reference numerals.

A circuit block 13' is a circuit which concerns the emission, and is included in the LED units 61a to 61d. A circuit block 14' is a circuit which concerns the flash firing and is included in the flash units 61a to 61d.

LEDs 631, 632, 633 in the circuit block 13' are red, green and blue LEDs, respectively. A series circuit of a transistor and a variable resistor directly connected with each of the LEDs 631, 632, 633 is a drive circuit of the LED. Light emission times $t_{RD}$, $t_{GR}$, $t_{BL}$ of the red, green and blue LEDs 631, 632, 633 are controlled by controlling the ON-times of transistors Tr2, Tr3, Tr4.

Variable resistors BR1, BR2, BR3 are adapted to adjust the luminance of the red, green blue LEDs 631, 632, 633, respectively. The color temperature is corrected by controlling the luminance balance. When the chromaticity data (x, y) is inputted by the color temperature correction levers 64A, 64B, the luminance balances of the LEDs of the respective colors R, G, B are calculated by the emission controller 12. The resistance values of the respective variable resistors BR1, BR2, BR3 are automatically set based on these calculation results.

Since an object is at a short distance in close-up photographing, the projection angle of the LEDs 63 of the ring flash 60 is fixed. Thus, the drivers 131, 132 of FIG. 7 which correspond to actuators for changing the projection angle of the LEDs 63 are not provided.

Figure 19:
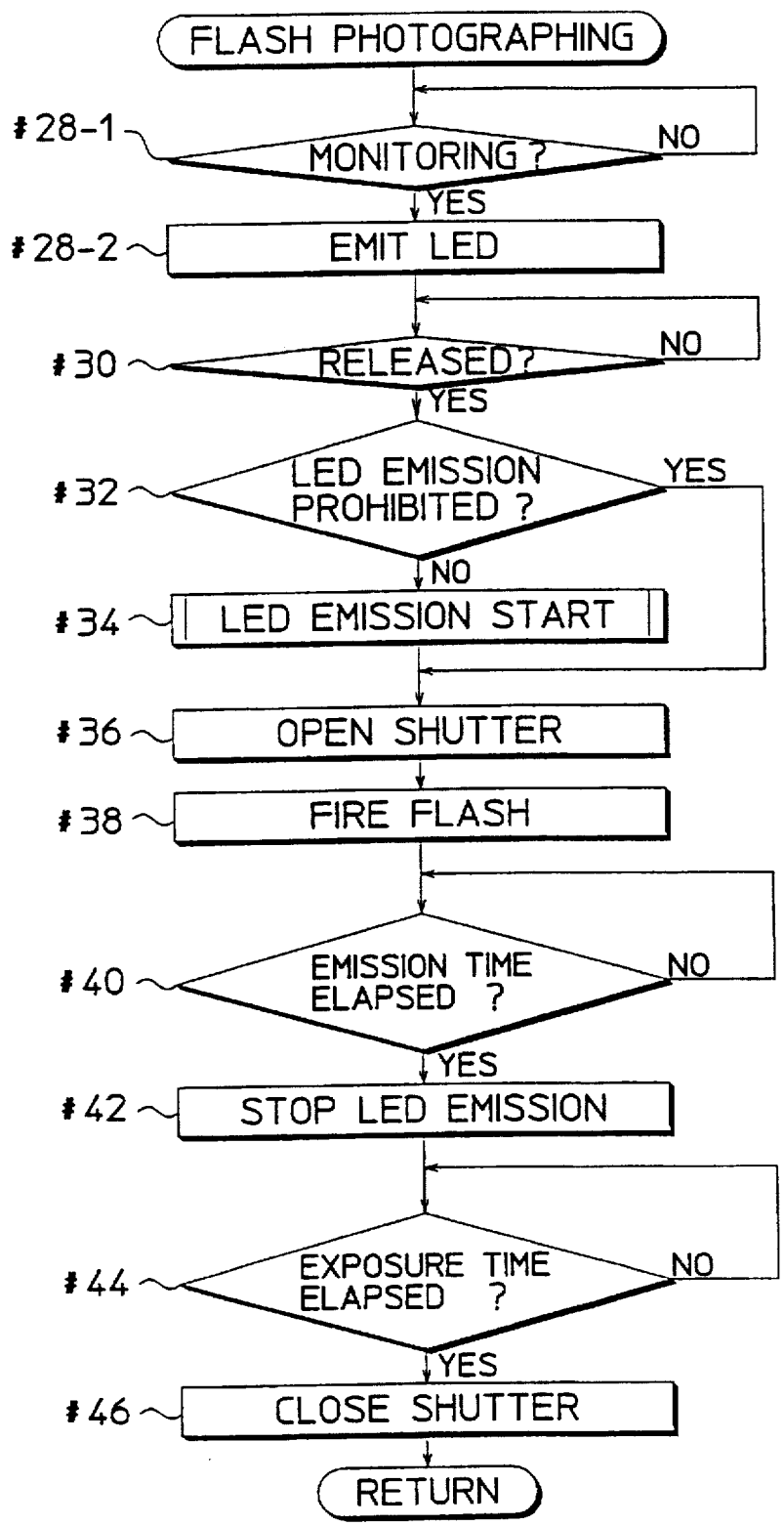
FIG. 19 is a flowchart showing a light emission processing in flash photographing in use of the ring electronic flash shown in FIG. 15.

In close-up photographing using this ring flash 60, flash photographing is performed in accordance with the flowchart of FIG. 19. Since the object distance is short in close-up photographing, the illumination light after the color temperature correction can be monitored by operating the monitor switch 65 of the ring flash 60 before an exposure.

In this case, when the monitoring of illumination light is designated by the monitor switch 65 (Step #28-1), one each of the red, green and blue LEDs 631, 632, 633 (a total of twelve LEDs) is caused to emit light in the respective LED units 62a to 62d (Step #28-2). For example, only the LEDs 63 in the first row (outermost row near the outer periphery) are caused to emit light in the respective LED units 62a to 62d. Only twelve LEDs are caused to emit light in the monitoring emission to save the power to be consumed. Accordingly, not only the LEDs 63 in the first row but also those in the second row or in the first column or any suitable combination of the LEDs may be caused to emit light.

Thereafter, when the shutter release button 25 is pressed by the full stroke to designate an exposure (YES in Step #30), the emission of all the LEDs 63 is started (Step #34) unless the LED emission prohibition mode is set by the emission prohibition switch 66 (YES in Step #32). Subsequently, the exposure is started by opening the shutter (Step #36) and the xenon discharge tubes 144 of the flash units 61a to 61d are fired at a specified timing (Step #38).

Upon the elapse of the light emission times $t_{RD}$, $t_{GN}$, $t_{BL}$ (YES in Step #40), the light emission of the red, green and blue LEDs 631, 632, 633 is stopped (Step #42). Further, upon the elapse of a specified exposure time (YES in Step #44), the flash photographing is completed by closing the shutter (Step #46).

Although the LED units 62a to 62d in which nine LEDs 63 of three primary colors are arranged in a matrix and which independently emit the lights of the respective colors are adopted in this embodiment, there may be adopted LED units in which the lights from the LEDs 631, 632, 633 of the respective colors R, G, B are mixed and which emits the resulting mixed light. Such LED units can reduce the illuminance nonuniformity on an object surface.

Figure 20:
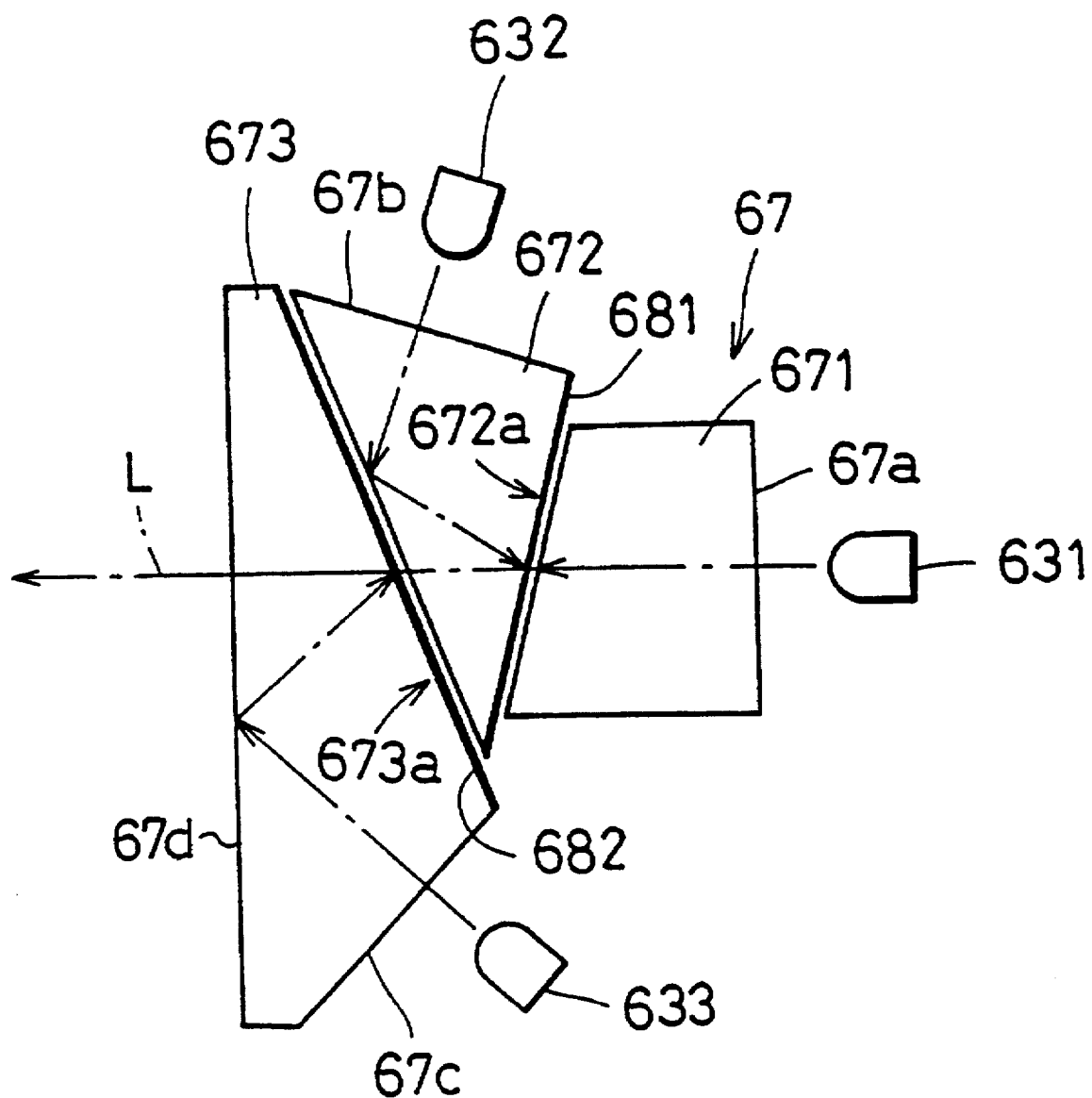
FIG. 20 shows a fourth embodiment of the invention, in particular, diagrammatically showing a basic construction of an LED unit for emitting a mixed light of colors R (red), G (green), and B (blue)

FIG. 20 is a diagram showing a basic construction of an LED unit for emitting a mixed light of respective colors R, G, B as an auxiliary emission unit in a fourth embodiment of the invention.

The LED unit shown in FIG. 20 mixes lights of the respective colors R, G, B using a mixing prism, and includes a dichroic prism 67 and three LEDs 631, 632, 633 for emitting lights of the respective colors R, G, B. A dichroic film 681 for reflecting only a green light is deposited on a slanted surface 672a (surface abutting against a rectangular prism 671) of a triangular prism 672 in the middle of the dichroic prism 67, and a dichroic film 68 for reflecting only a blue light is deposited on a slanted surface 673a (surface abutting against the triangular prism 672) of a triangular prism 673 at the left side.

The red LED 631 is arranged in vicinity of an input/output portion 67a (portion having a surface normal to an optic axis L of the rectangular prism 671) of the dichroic prism 67; the green LED 632 is arranged in vicinity of an input/output portion 67b (portion having a surface exposed to the outside of the triangular prism 671) of the dichroic prism 67; and the blue LED 633 is arranged in vicinity of an input/output portion 67c (portion having an exposed surface inclined with respect to the optic axis L of the triangular prism 673) of the dichroic prism 67.

The red light emitted from the red LED 631 is incident on the input/output portion 67a and emerges from the input/output portion 67d (portion having a surface normal to the optic axis L of the triangular prism 673) of the dichroic prism 67 after passing along the optic axis L in the dichroic prism 67. The green light emitted from the green LED 632 is incident on the input/output portion 67b, is reflected by the slanted surface 672b abutting against the triangular prism 673 toward the surface 672a where the dichroic film 681 is formed, is reflected by the slanted surface 672a to pass along the optic axis L in the dichroic prism 67, and emerges from the input/output portion 67d. The blue light emitted from the blue LED 633 is incident on the input/output portion 67b, is reflected by the slanted surface 67b toward the surface 673a where the dichroic film 682 is formed, is reflected by the slanted surface 673a to pass along the optic axis L, and emerges from the input/output portion 67d.

Accordingly, light in which red, green and blue lights are uniformly mixed emerges from the input/output portion 67d of the dichroic prism 67.

Although the LEDs 631, 632, 633 of three primary colors are used as light sources for the color temperature correction of the LED unit in this embodiment, light similar to the sunlight may be split into light components of three primary colors and the split light components are mixed again to be projected onto an object.

Figure 21:
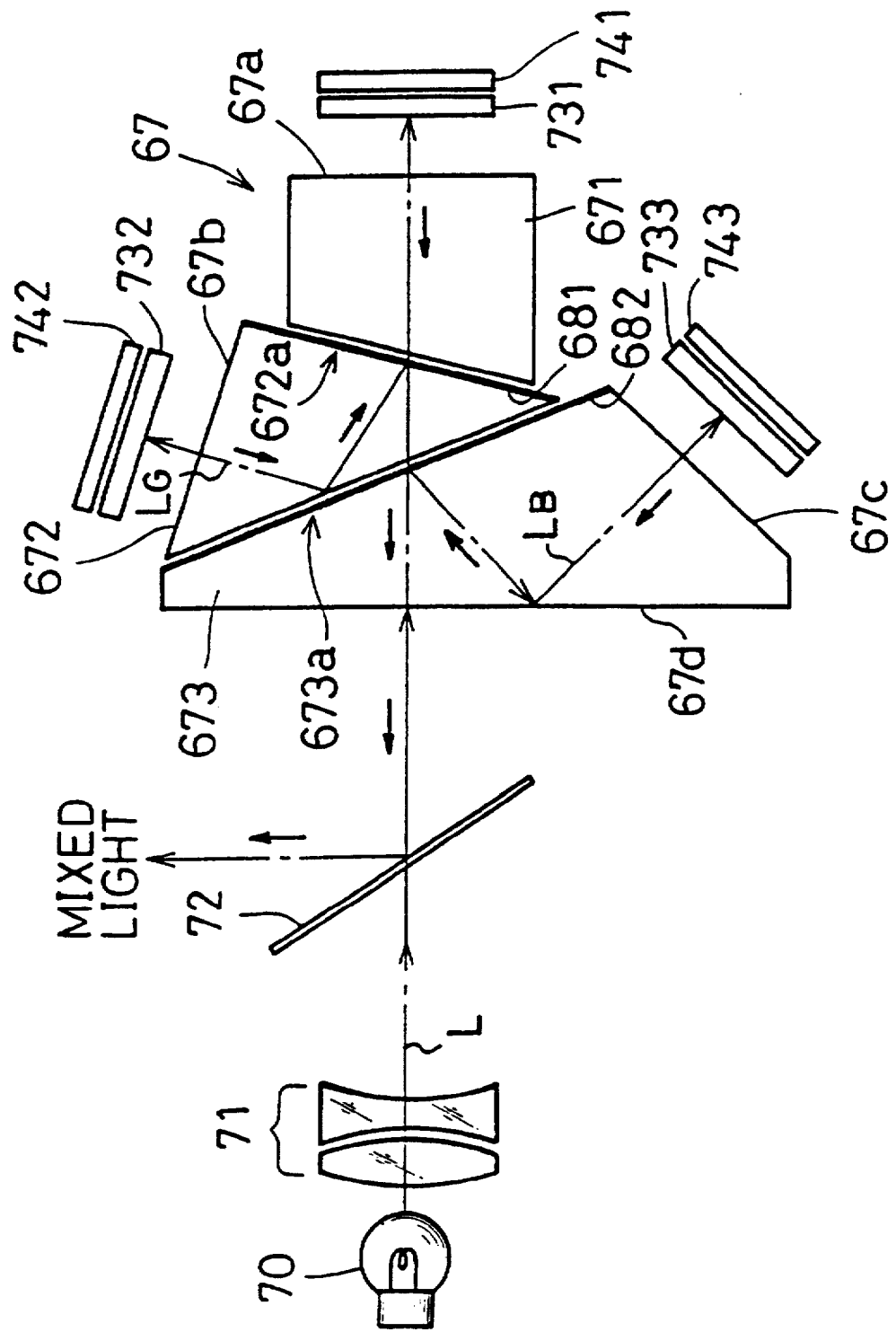
FIG. 21 shows a fifth embodiment of the invention, in particular, diagrammatically showing a basic construction of an LED unit for emitting a mixed light of colors R, G, and B.

FIG. 21 is a diagram showing a basic construction of an LED unit for emitting a mixed light of respective colors R, G, B as an auxiliary emission unit in a fifth embodiment of the invention.

FIG. 21 differs from FIG. 20 in that a beam attenuator 731 and a full reflection mirror 741 are arranged instead of the red LED 631; a beam attenuator 732 and a full reflection mirror 742 are arranged instead of the green LED 632; a beam attenuator 733 and a full reflection mirror 743 are arranged instead of the blue LED 633; and a semitransparent mirror 72, an optical system 71 and a light source 70 are arranged on the optic axis L before the emergence surface 673c of the dichroic prism 67.

In FIG. 21, the mixed light of the respective colors R, G, B is reflected upward of the semitransparent mirror 72. Accordingly, the LED unit is mounted on the ring flash main body such that the light projection portion 60A is positioned above the semitransparent mirror 72.

The light source 70 is constructed by a lamp for emitting light similar to the sunlight such as a short arc metal halide lamp and a short arc lamp. The optical system 71 makes beams emitted from the light source 70 into beams parallel to the optic axis L.

The semitransparent mirror 72 causes the beams from the light source 70 incident thereon via the optical system 71 to transmit toward the dichroic prism 67 and reflects the mixed light of the respective colors R, G, B upward with respect to the optic axis L.

The beam attenuators 731 to 733 are constructed, for example, by a liquid crystal shutter and adapted to reduce the amounts of lights of the respective colors R, G, B incident on the mirrors 741 to 743 from the dichroic prism 67. The beam attenuators 731 to 733 have, for example, an aperture of a variable diameter, and reduces the light amounts by adjusting the area of the aperture. Alternatively, the transmittance of the beam attenuators 731 to 733 may be made variable and the light amount may be controllably reduced by adjusting the transmittance.

In the above construction, the beams emitted from the light source 70 is incident on the input/output portion 67d of the dichroic prism 67 via the optical system 71 and the semitransparent mirror 72. Among the beams transmitting through the dichroic prism 67, the beams of blue light components are reflected by the slanted surface 673a and transmits through the triangular prism 673 along a shown optical path $L_B$, and then emerge from the input/output portion 67c. The beams of green light components are reflected by the slanted surface 672a, transmit through the triangular prism 672 along a shown optical path $L_G$ and then emerge from the input/output portion 67b. The beams of red light components emerge from the input/output portion 67a after transmitting along the optic axis L without being reflected by the slanted surfaces 673a, 672a.

The beams of the respective color light components R, G, B having emerged from the input/output portions 67a to 67c of the dichroic prism 67 are caused to be incident on the input ports 67a to 67c by the mirrors 741, 742, 743. At this time, these beams are incident thereon after being attenuated to specified levels (i.e., adjusted at specified emission ratios). The beams of the respective color light components R, G, B having been incident again travel along an optic path opposite from the one when they were first incident and emerge from the input/output portion 67d after being mixed. This mixed light is introduced to a projection window by the semitransparent mirror 72 to be projected on the object.

As described above, one, two or more auxiliary light emission units for emitting lights having color temperatures different from that of flash light and different from each other are provided and the chromatic lights emitted from these auxiliary light emission units are mixed with flash light. Accordingly, the color temperature of the flash light projected on the object can be easily changed to a desired color temperature.

Further, since the projection range of the auxiliary light emission units is made changeable, the chromatic lights can be securely projected on the object even if a distance to the object varies.

The auxiliary light emission units emit continuous lights having color temperatures different from each other, and the color temperature of the flash light is changed by controlling the respective emission times of the continuous lights. Accordingly, the object can be illuminated at a desired color temperature regardless of the object distance.

Further, since the luminance ratio of a plurality of lights having different color temperatures which are emitted from the auxiliary light emission units is made changeable, the color temperature of the flash light can be easily and continuously changed by controlling the luminance ratio.

Furthermore, since the color temperatures of the lights emitted from the auxiliary light emission units can be monitored, the color temperature of the flash light can be easily adjusted.

Further, the auxiliary light emission units is constructed by a plurality of light emitting elements for different color temperatures and only a part of the light emitting elements are caused to emit light in the monitoring emission. Accordingly, the energy for light emission can be consumed more efficiently.

Furthermore, since a plurality of single color lights having different color temperatures and emitted from the auxiliary light emission units are outputted while being mixed, the illuminance nonuniformity of single color lights projected on the object can be reduced.

Further, since the electronic flash is built in the camera, there can be constructed a compact flash photographing system capable of changing the color temperature of flash light.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An electronic flash comprising:
   a primary emission unit which emits flash light for illuminating an object;
   an auxiliary emission unit which emits light having a different color temperature from the flash light emitted by the primary emission unit to the object; and
   a controller which controls emission of the auxiliary emission unit when the primary emission unit emits flash light to adjust the color temperature of illumination light to the object.

2. An electronic flash according to claim 1, wherein the auxiliary emission unit includes a plurality of emission portions which respectively emit lights having different color temperatures from each other.

3. An electronic flash according to claim 1, wherein the projection angle of the auxiliary emission unit is changeable.

4. An electronic flash according to claim 1, wherein the emission time of the auxiliary emission unit is changeable.

5. An electronic flash according to claim 4, wherein the controller controls the emission time of the auxiliary emission unit in accordance with a distance to an object.

6. An electronic flash according to claim 4, wherein the auxiliary emission unit includes a plurality of emission portions which respectively emit lights having different color temperatures from each other, and the controller controls the respective emission times of the plurality of emission portions to adjust the color temperature of illumination light to the object.

7. An electronic flash according to claim 1, wherein the auxiliary emission unit includes a light emitting diode.

8. An electronic flash according to claim 1, further comprising an operation member which is operated by a photographer to render the auxiliary emission unit operable.

9. An electronic flash according to claim 8, wherein the auxiliary emission unit includes a plurality of emission portions, and the operation member is operable to selectively render the plurality of emission portions operable.

10. An electronic flash according to claim 1, comprising a plurality of primary emission units and a plurality of auxiliary emission units.

11. A camera comprising:

an electronic flash which emits flash light for illuminating an object for photography;

an auxiliary illumination unit which emits light having a different color temperature from the flash light emitted by the electronic flash to the object; and a controller which controls emission of the auxiliary emission unit when the electronic flash emits flash light to adjust the color temperature of illumination light to the object.

12. A camera according to claim 11, wherein the auxiliary emission unit includes a plurality of emission portions which respectively emit lights having different color temperatures from each other.

13. A camera according to claim 11, wherein the projection angle of the auxiliary emission unit is changeable.

14. A camera according to claim 11, wherein the emission time of the auxiliary emission unit is changeable.

15. A camera according to claim 14, wherein the controller controls the emission time of the auxiliary emission unit in accordance with a distance to an object.

16. A camera according to claim 14, wherein the auxiliary emission unit includes a plurality of emission portions which respectively emit lights having different color temperatures from each other, and the controller controls the respective emission times of the plurality of emission portions to adjust the color temperature of illumination light to the object.

17. A camera according to claim 11, wherein the auxiliary emission unit includes a light emitting diode.

18. A camera according to claim 11, further comprising an operation member which is operated by a photographer to render the auxiliary emission unit operable.

19. A camera according to claim 18, wherein the auxiliary emission unit includes a plurality of emission portions, and the operation member is operable to selectively render the plurality of emission portions operable.

* * * * *